(12) United States Patent
Kim et al.

(10) Patent No.: US 10,911,097 B2
(45) Date of Patent: Feb. 2, 2021

(54) METHOD AND DEVICE FOR TRANSMITTING AND RECEIVING PHYSICAL UPLINK CONTROL CHANNEL BETWEEN USER EQUIPMENT AND BASE STATION IN WIRELESS COMMUNICATION SYSTEM

(71) Applicant: LG Electronics Inc., Seoul (KR)

(72) Inventors: Seonwook Kim, Seoul (KR); Suckchel Yang, Seoul (KR); Joonkui Ahn, Seoul (KR); Changhwan Park, Seoul (KR); Byounghoon Kim, Seoul (KR); Jaehyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/363,187

(22) Filed: Mar. 25, 2019

(65) Prior Publication Data

US 2019/0222254 A1 Jul. 18, 2019

Related U.S. Application Data

(63) Continuation of application No. 16/065,570, filed as application No. PCT/KR2018/003271 on Mar. 21, 2018.

(Continued)

(51) Int. Cl.
*H04B 1/713* (2011.01)
*H04W 72/04* (2009.01)
(Continued)

(52) U.S. Cl.
CPC ............... *H04B 1/713* (2013.01); *H04L 5/00* (2013.01); *H04L 5/0012* (2013.01); *H04L 5/0051* (2013.01); *H04L 5/10* (2013.01); *H04W 72/0413* (2013.01); *H04W 72/0446* (2013.01); *H04W 72/0453* (2013.01)

(58) Field of Classification Search
CPC ....... H04L 5/00; H04L 5/0051; H04L 5/0094; H04L 5/10; H04L 5/1469; H04L 5/0012; H04L 5/0053; H04W 72/0446; H04W 72/0413; H04W 72/0453; H04B 1/713
See application file for complete search history.

(56) References Cited

U.S. PATENT DOCUMENTS

2014/0177580 A1* 6/2014 Takaoka ................ H04J 1/02
370/329
2016/0095137 A1 3/2016 Chen et al.
(Continued)

FOREIGN PATENT DOCUMENTS

JP 6105672 3/2017
KR 20100137391 12/2010
(Continued)

OTHER PUBLICATIONS

Extended European Search Report in European Application No. 18770480.4, dated Jan. 20, 2020, 9 pages.
Huawei, HiSilicon, "Review Summary for AI 7.3.2.2. PUCCH structure in long-duration," R1-1801145, 3GPP TSG RAN WG1 Ad-Hoc Meeting, Vancouver, Canada, dated Jan. 22-26, 2018, 21 pages.

(Continued)

*Primary Examiner* — Brian D Nguyen
(74) *Attorney, Agent, or Firm* — Fish & Richardson P.C.

(57) ABSTRACT

The present invention disclose a method for transmitting and receiving a physical uplink control channel between a user equipment and a base station and device for supporting the same.

14 Claims, 15 Drawing Sheets

Related U.S. Application Data

(60) Provisional application No. 62/575,540, filed on Oct. 23, 2017, provisional application No. 62/566,562, filed on Oct. 2, 2017, provisional application No. 62/565,176, filed on Sep. 29, 2017, provisional application No. 62/555,684, filed on Sep. 8, 2017, provisional application No. 62/544,127, filed on Aug. 11, 2017, provisional application No. 62/543,961, filed on Aug. 10, 2017, provisional application No. 62/520,502, filed on Jun. 15, 2017, provisional application No. 62/501,191, filed on May 4, 2017, provisional application No. 62/501,073, filed on May 3, 2017, provisional application No. 62/481,037, filed on Apr. 3, 2017, provisional application No. 62/474,552, filed on Mar. 21, 2017.

(51) Int. Cl.
*H04L 5/00* (2006.01)
*H04L 5/10* (2006.01)

(56) References Cited

U.S. PATENT DOCUMENTS

| | | | |
|---|---|---|---|
| 2016/0128052 A1* | 5/2016 | Ouchi | H04L 5/0053 370/329 |
| 2016/0197754 A1 | 7/2016 | Shin et al. | |
| 2016/0374090 A1 | 12/2016 | Kim et al. | |
| 2017/0013612 A1* | 1/2017 | Nayeb Nazar | H04L 1/0057 |
| 2017/0041923 A1* | 2/2017 | Park | H04L 1/1822 |
| 2017/0164213 A1* | 6/2017 | Lim | H04L 5/005 |
| 2017/0164352 A1* | 6/2017 | Yang | H04L 5/0053 |
| 2017/0332364 A1 | 11/2017 | Sano et al. | |
| 2018/0110041 A1 | 4/2018 | Bendlin et al. | |
| 2018/0139749 A1* | 5/2018 | Takeda | H04W 72/0413 |
| 2019/0319766 A1 | 10/2019 | Baldemair et al. | |
| 2020/0052841 A1* | 2/2020 | Takeda | H04J 13/004 |

FOREIGN PATENT DOCUMENTS

| | | |
|---|---|---|
| KR | 20110117595 | 10/2011 |
| KR | 101306728 | 9/2013 |
| KR | 1020160094237 | 8/2016 |
| KR | 101951680 | 2/2019 |
| WO | WO2016/068542 | 5/2016 |
| WO | WO2016/093600 | 6/2016 |
| WO | WO2017026814 | 2/2017 |
| WO | WO2019107432 | 6/2019 |

OTHER PUBLICATIONS

Japanese Office Action in Japanese Application No. 2019-503422, dated Feb. 25, 2020, 4 pages (with English translation).
Nokia, Alcatel-Lucent Shanghai Bell, "On the long PUCCH formats for NR," R1-1703320, 3GPP TSG RAN WG1#NR, Athens, Greece, dated Feb. 13-17, 2017, 4 pages, XP051210450.
Nokia, Alcatel-Lucent Shanghai Bell, "On the long PUCCH formats for NR," R1-1703320, 3GPP TSG RAN WG1#NR, Athens, Greece, dated Feb. 13-17, 2017, 4 pages, XP051220472.
CATT, 'Further details of the long PUCCH structure', R1-1702098, 3GPP TSG RAN WG1 Meeting #88, Athens, Greece, Feb. 7, 2017 (http://www.3gpp.org/ftp/tsg_ran/WG1_RL1/TSGR1_88/Docs/).
Ericsson, 'On Long PUCCH', R1-1703294, 3GPP TSG RAN WG1 Meeting #88, Athens, Greece, Feb. 7, 2017 (http://www.3gpp.org/ftp/tsg_ran/WG1_RL1/TSGR1_88/Docs/).
Nokia, 'On the design of long PUCCH for NR', R1-1703319, 3GPP TSG RAN WG1 Meeting #88, Athens, Greece, Feb. 6, 2017 (http://www.3gpp.org/ftp/tsg_ran/WG1_RL1/TSGR1_88/Docs/).
Nec, "Frequency hopping schemes for LTE Rel-13 MTC," R1-150286, 3GPP TSG RAN WG1 Meeting #80, Athens, Greece, Feb. 9-13, 2015, 4 pages.
LG Electronics, "HARQ-ACK PUCCH transmission for Rel-13 CA," R1-151502, 3GPP TSG RAN WG1 Meeting #80bis Belgrade, Serbia, Apr. 20-24, 2015, 6 pages.
Notice of Allowance in Korean Application No. 10-2018-7015566, dated Dec. 1, 2018, 4 pages (with partial English Translation).
LG Electronics, "Evaluation on new PUCCH format for Rel-13 CA," 'R1-151504,' 3GPP TSG RAN WG1 Meeting #80bis, Belgrade, Serbia, Apr. 20-24, 2015, 8 pages.
Ericsson, "Clarification of OCC=2 and OCC=4 MU-MIMO Transmission," 'R1-165105,' 3GPP TSG-RAN WG1#85, Nanjing, China May 23-27, 2016, 3 pages.
Ericsson, "On two-symbol short PUCCH," R1-1703293, 3GPP TSG RAN WG1 Meeting #88, Athens, Greece, Feb. 13-17, 2017, 4 pages.
Sharp, "Structure of PUCCH in long duration," R1-1703241, 3GPP TSG RAN WG1 Meeting #88, Athens, Greece, Feb. 13-17, 2017, 3 pages.
United States Notice of Allowance in U.S. Appl. No. 16/065,570, dated Nov. 14, 2019, 6 pages.
Indian Office Action in Indian Application No. 201927019555, dated Oct. 31, 2020, 7 pages (with English translation).
Nokia, Alcatel-Lucent Shanghai Bell, "On the long PUCCH formats for NR," R1-1703320, 3GPP TSG RAN WG1#NR, Athens, Greece, dated Feb. 13-17, 2017, 4 pages.

* cited by examiner

METHOD AND DEVICE FOR TRANSMITTING AND RECEIVING PHYSICAL UPLINK CONTROL CHANNEL BETWEEN USER EQUIPMENT AND BASE STATION IN WIRELESS COMMUNICATION SYSTEM

CROSS-REFERENCE TO RELATED APPLICATIONS

This application is a continuation of U.S. application Ser. No. 16/065,570, filed on Jun. 22, 2018, which is a National Stage application under 35 U.S.C. § 371 of International Application No. PCT/KR2018/003271, filed on Mar. 21, 2018, which claims the benefit of U.S. Provisional Application No. 62/575,540, filed on Oct. 23, 2017, U.S. Provisional Application No. 62/566,562, filed on Oct. 2, 2017, U.S. Provisional Application No. 62/565,176, filed on Sep. 29, 2017, U.S. Provisional Application No. 62/555,684, filed on Sep. 8, 2017, U.S. Provisional Application No. 62/544,127, filed on Aug. 11, 2017, U.S. Provisional Application No. 62/543,961, filed on Aug. 10, 2017 U.S. Provisional Application No. 62/520,502, filed on Jun. 15, 2017, U.S. Provisional Application No. 62/501,191, filed on May 4, 2017, U.S. Provisional Application No. 62/501,073, filed on May 3, 2017, U.S. Provisional Application No. 62/481,037, filed on Apr. 3, 2017, and U.S. Provisional Application No. 62/474,552, filed on Mar. 21, 2017. The disclosures of the prior applications are incorporated by reference in their entirety.

TECHNICAL FIELD

The present invention relates to a wireless communication system, and more particular, to a method for transmitting and receiving a physical uplink control channel between a user equipment and a base station and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present invention is to provide a method for transmitting and receiving a physical uplink control channel between a user equipment and a base station in a wireless communication system and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method for transmitting and receiving a physical uplink control channel between a user equipment and a base station in a wireless communication system and devices for supporting the same.

In an aspect of the present invention, provided herein is a method for transmitting an uplink control signal by a user equipment (UE) in a wireless communication system, The method includes: receiving, from a base station, configuration information on presence or absence of frequency hopping for transmission of a physical uplink control channel (PUCCH), which is composed of four or more symbols; determining resource locations of a demodulation reference signal (DM-RS) and uplink control information (UCI), which are included in the PUCCH and time-division-multiplexed (TDMed) on different symbols according to symbol duration of the PUCCH and the presence or absence of the frequency hopping; and transmitting the PUCCH based on the determined resource locations of the DM-RS and UCI, wherein if the symbol duration of the PUCCH is equal to or less than X-symbol duration (where X is a natural number), the resource locations to which the DM-RS and UCI are mapped may be configured to vary according to the presence or absence of the frequency hopping, and wherein if the symbol duration of the PUCCH is more than the X-symbol duration (where X is the natural number), the resource locations to which the DM-RS and UCI are mapped may be configured to be fixed regardless of the presence or absence of the frequency hopping.

In another aspect of the present invention, provided herein is a method for receiving an uplink control signal by a base station (BS) in a wireless communication system. The method includes: transmitting, to a user equipment (UE), configuration information on presence or absence of frequency hopping for transmission of a physical uplink control channel (PUCCH), which is composed of four or more symbols; and receiving, from the UE, the PUCCH including a demodulation reference signal (DM-RS) and uplink control information (UCI), which are time-division-multiplexed (TDMed) on different symbols according to symbol duration of the PUCCH and the presence or absence of the frequency hopping, wherein if the symbol duration of the PUCCH is equal to or less than X-symbol duration (where X is a natural number), resource locations to which the DM-RS and UCI are mapped may be configured to vary according to the presence or absence of the frequency hopping, and wherein if the symbol duration of the PUCCH is more than the X-symbol duration (where X is a natural number), the resource locations to which the DM-RS and UCI are mapped may be configured to be fixed regardless of the presence or absence of the frequency hopping.

In a further aspect of the present invention, provided herein is a user equipment (UE) for transmitting a physical uplink control channel (PUCCH) to a base station (BS) in a wireless communication system. The UE includes: a transmitter; a receiver; and a processor connected to the transmitter and receiver, wherein the processor may be configured to: receive, from the BS, configuration information on presence or absence of frequency hopping for transmission of the PUCCH, which is composed of four or more symbols; determine resource locations of a demodulation reference signal (DM-RS) and uplink control information (UCI), which are included in the PUCCH and time-division-multiplexed (TDMed) on different symbols according to symbol duration of the PUCCH and the presence or absence of the frequency hopping; and transmit the PUCCH based on the determined resource locations of the DM-RS and UCI, wherein if the symbol duration of the PUCCH is equal to or less than X-symbol duration (where X is a natural number), the resource locations to which the DM-RS and UCI are mapped may be configured to vary according to the presence or absence of the frequency hopping, and wherein if the symbol duration of the PUCCH is more than the X-symbol duration (where X is the natural number), the resource locations to which the DM-RS and UCI are mapped are configured to be fixed regardless of the presence or absence of the frequency hopping.

In a still further aspect of the present invention, provided herein is a base station (BS) for receiving a physical uplink control channel (PUCCH) from a user equipment (UE) in a wireless communication system. The BS includes: a transmitter; a receiver; and a processor connected to the transmitter and receiver, wherein the processor may be configured to: transmit, to the UE, configuration information on presence or absence of frequency hopping for transmission of a physical uplink control channel (PUCCH), which is composed of four or more symbols; and receive, from the UE, the PUCCH including a demodulation reference signal (DM-RS) and uplink control information (UCI), which are time-division-multiplexed (TDMed) on different symbols according to symbol duration of the PUCCH and the presence or absence of the frequency hopping, wherein if the symbol duration of the PUCCH is equal to or less than X-symbol duration (where X is a natural number), resource locations to which the DM-RS and UCI are mapped may be configured to vary according to the presence or absence of the frequency hopping, and wherein if the symbol duration of the PUCCH is more than the X-symbol duration (where X is the natural number), the resource locations to which the DM-RS and UCI are mapped may be configured to be fixed regardless of the presence or absence of the frequency hopping.

In the above-described configuration, X may be set to 4.

When the symbol duration of the PUCCH is 4-symbol duration, the number of symbols to which the DM-RS is mapped may vary according to the presence or absence of the frequency hopping.

Specifically, when the symbol duration of the PUCCH is 4-symbol duration, the resource location of the DM-RS in the PUCCH may be determined as the first and third symbols if the frequency hopping is configured, and the resource location of the DM-RS in the PUCCH may be determined as the second symbol if the frequency hopping is not configured.

When the symbol duration of the PUCCH is more than the 4-symbol duration, the DM-RS in the PUCCH may be mapped to two symbols regardless of the presence or absence of the frequency hopping.

When the symbol duration of the PUCCH is 5-symbol duration, the resource location of the DM-RS in the PUCCH may be determined as the first and fourth symbols regardless of the presence or absence of the frequency hopping.

When the symbol duration of the PUCCH is 6-symbol or 7-symbol duration, the resource location of the DM-RS in the PUCCH may be determined as the second and fifth symbols regardless of the presence or absence of the frequency hopping.

When the symbol duration of the PUCCH is 8-symbol duration, the resource location of the DM-RS in the PUCCH may be determined as the second and sixth symbols regardless of the presence or absence of the frequency hopping.

When the symbol duration of the PUCCH is 9-symbol duration, the resource location of the DM-RS in the PUCCH may be determined as the second and seventh symbols regardless of the presence or absence of the frequency hopping.

When the symbol duration of the PUCCH is 10-symbol duration, the resource location of the DM-RS in the PUCCH may be determined as the third and eighth symbols regardless of the presence or absence of the frequency hopping, or the resource location of the DM-RS in the PUCCH may be determined as the second, fourth, seventh, and ninth symbols regardless of the presence or absence of the frequency hopping.

When the symbol duration of the PUCCH is 11-symbol duration, the resource location of the DM-RS in the PUCCH may be determined as the third and eighth symbols regardless of the presence or absence of the frequency hopping, or the resource location of the DM-RS in the PUCCH may be determined as the second, third, fourth, seventh, and tenth symbols regardless of the presence or absence of the frequency hopping.

When the symbol duration of the PUCCH is 12-symbol duration, the resource location of the DM-RS in the PUCCH may be determined as the third and ninth symbols regardless of the presence or absence of the frequency hopping, or the resource location of the DM-RS in the PUCCH may be determined as the second, fifth, eighth, and eleventh symbols regardless of the presence or absence of the frequency hopping.

When the symbol duration of the PUCCH is 13-symbol duration, the resource location of the DM-RS in the PUCCH may be determined as the third and tenth symbols regardless of the presence or absence of the frequency hopping, or the resource location of the DM-RS in the PUCCH may be determined as the second, fifth, eighth, and twelfth symbols regardless of the presence or absence of the frequency hopping.

when the symbol duration of the PUCCH is 14-symbol duration, the resource location of the DM-RS in the PUCCH may be determined as the fourth and eleventh symbols regardless of the presence or absence of the frequency hopping, or the resource location of the DM-RS in the PUCCH may be determined as the second, sixth, ninth, and thirteenth symbols regardless of the presence or absence of the frequency hopping.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, uplink control information can be efficiently transmitted and received in a wireless communication system to which the present invention is applicable.

Particularly, compared to the prior art, the UE and BS can exchange uplink control information with each other more efficiently based on the structure of the physical uplink control channel according to an embodiment of the present invention.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
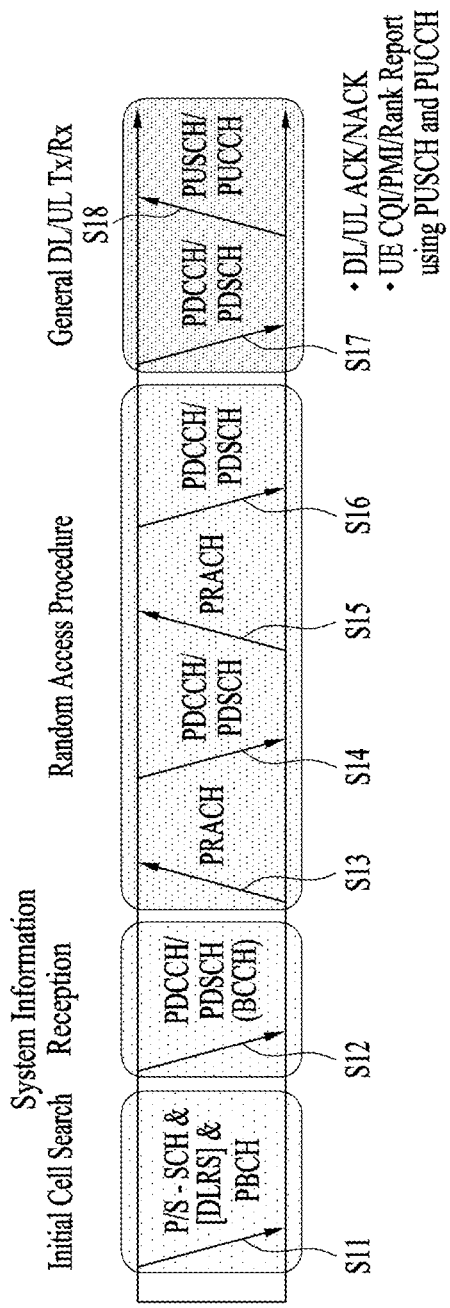
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS.

The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
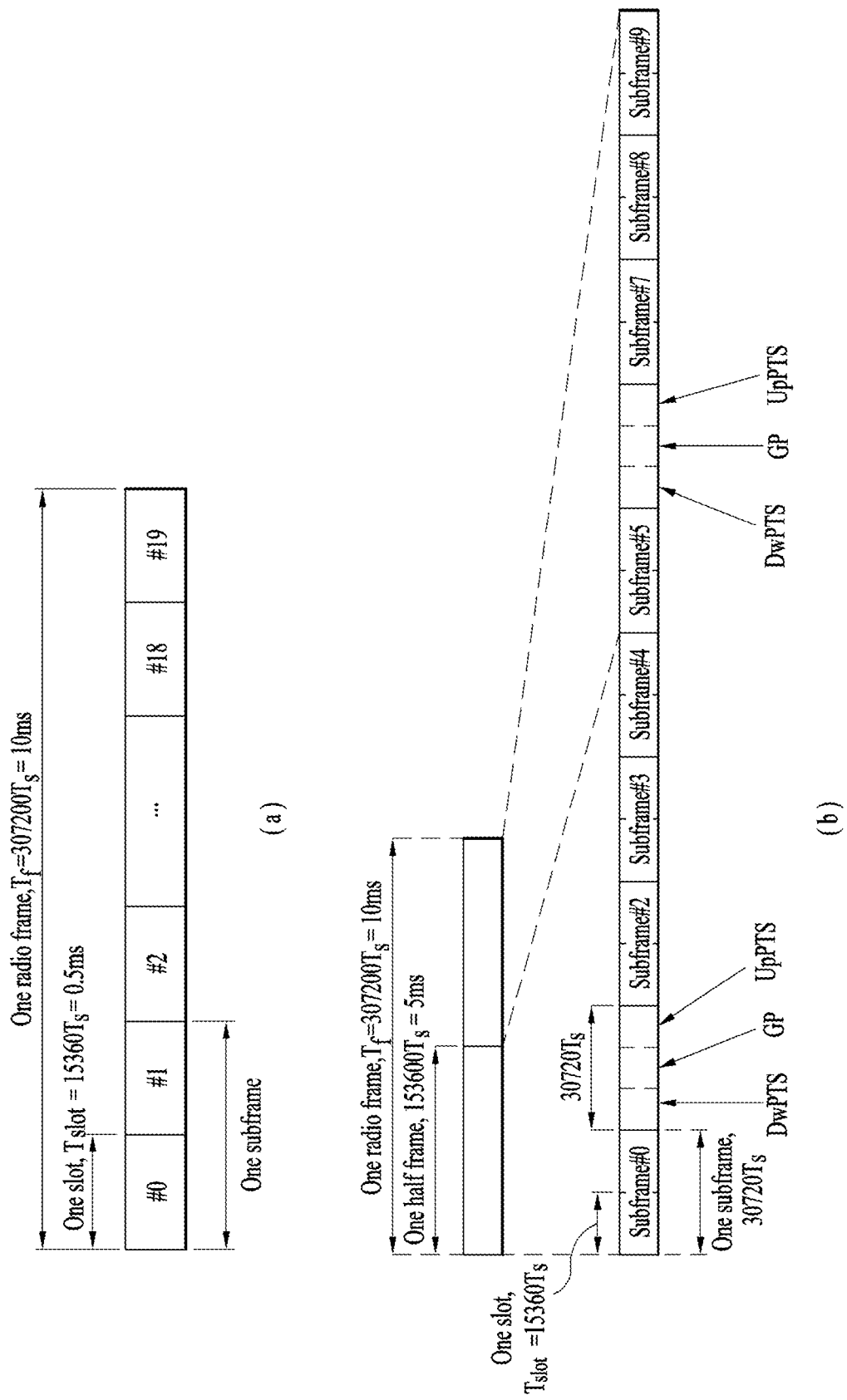
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In addition, in the LTE Rel-13 system, the configuration of special subframes (i.e., the lengths of DwPTS/GP/UpPTS) are newly configured by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.

mation (DCI). The DCI transports UL resource assignment information, DL resource assignment information, or UL Transmission (Tx) power control commands for a UE group.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
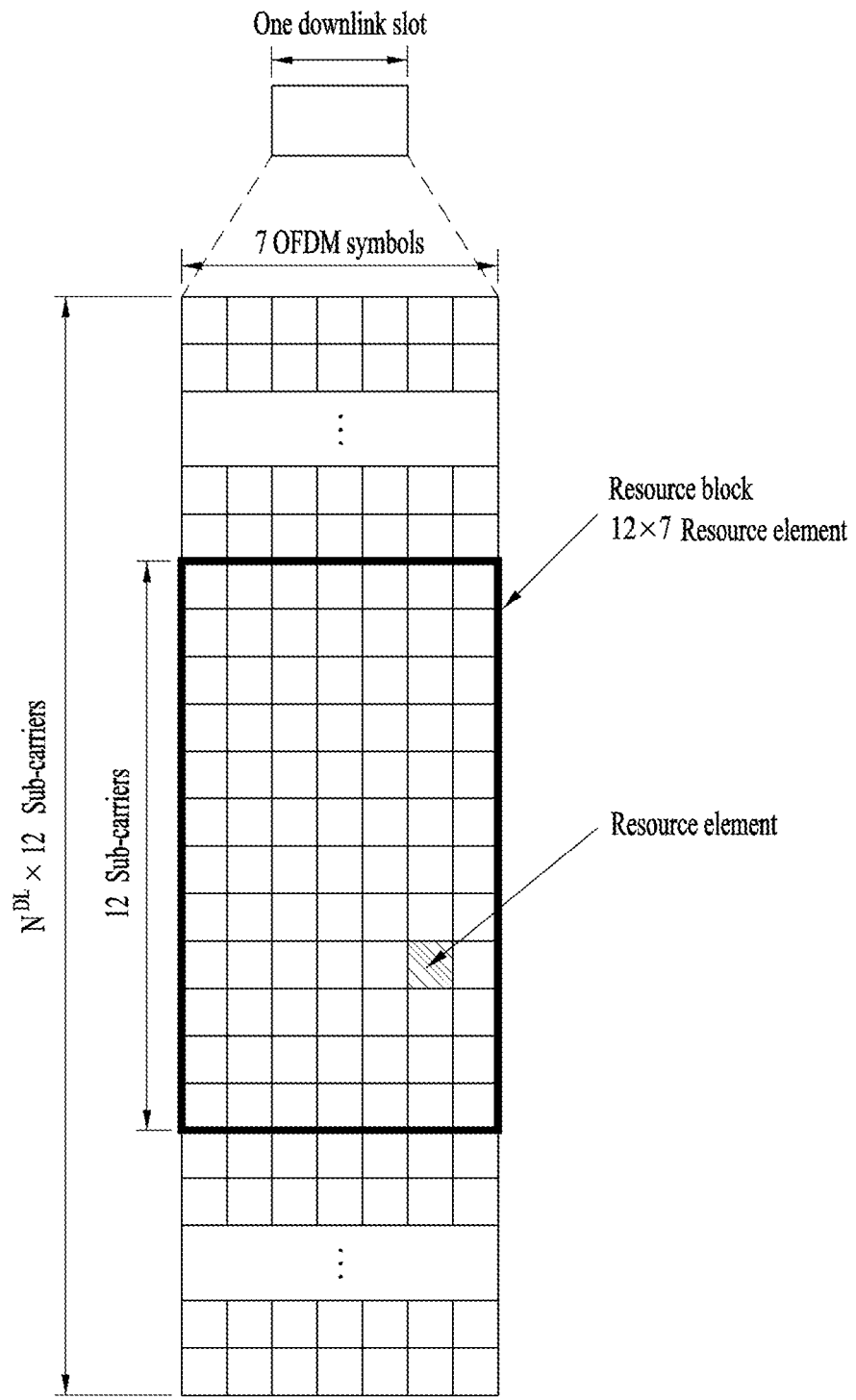
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
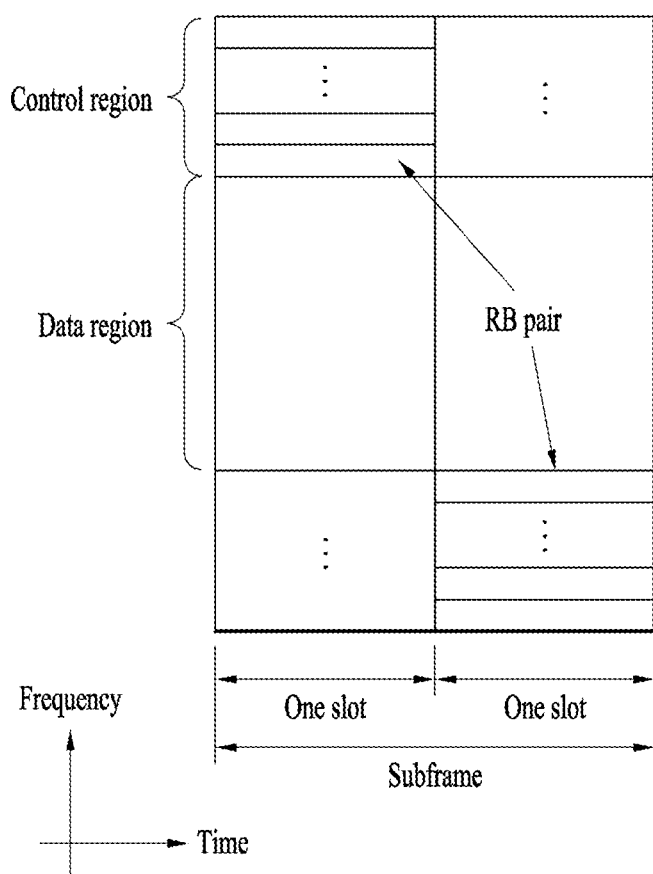
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
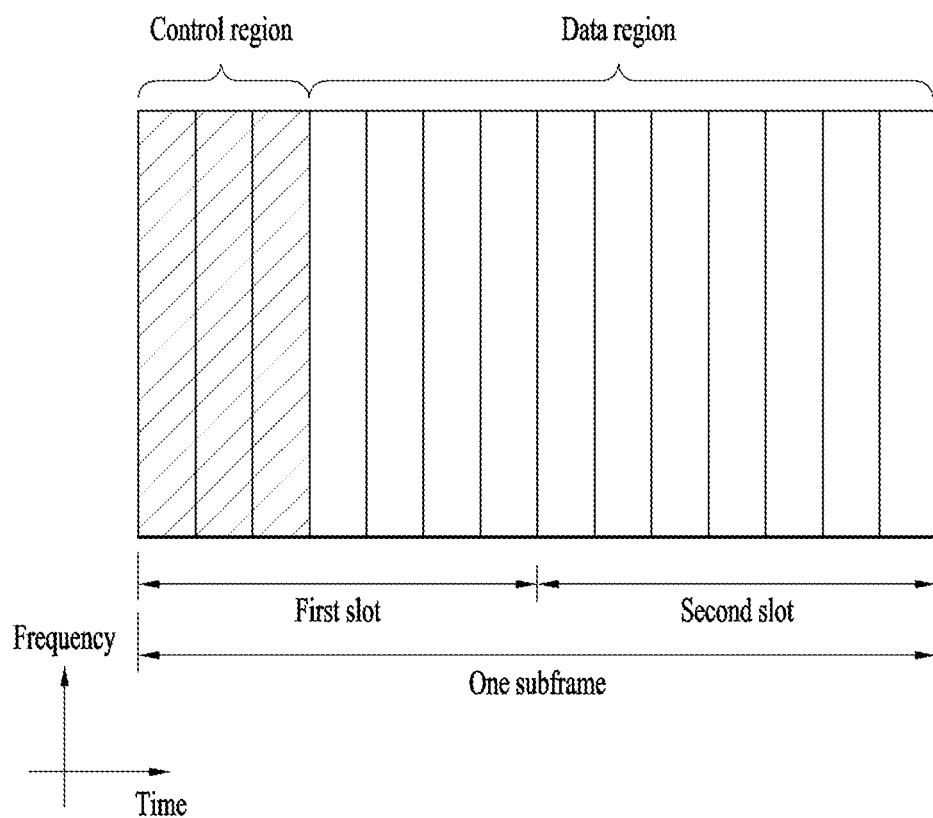
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Infor- 2. New Radio Access Technology System As a number of communication devices have required higher communication capacity, the necessity for the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

The new radio access technology system has been proposed by considering the enhanced mobile broadband communication, massive MTC, Ultra-reliable and low latency communication (URLLC), etc. In the present invention, the corresponding technology is referred to as the new RAT or new radio (NR) for convenience of description.

2.1. Numerologies

The NR system to which the present invention is applicable supports various OFDM numerologies as shown in the following table. In this case, the value of p and cyclic prefix information per carrier bandwidth part may be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 2

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

For DL and UL transmission, a frame may be configured to have a length of 10 ms. Each frame may be composed of ten subframes, each having a length of 1 ms. In this case, the number of consecutive OFDM symbols in each subframe is defined as follows: $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0 \ldots, N_{slot}^{subframe,\mu}-1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined based on the cyclic prefix as shown in the following table. The start slot ($n_s^\mu$) of one subframe is aligned with the start OFDM symbol ($n_s^\mu N_{symb}^{slot}$) of the same subframe in the time dimension. Table 3 shows the number of OFDM symbols in each slot/frame/subframe in the case of the normal cyclic prefix, and Table 4 shows the number of OFDM symbols in each slot/frame/subframe in the case of the extended cyclic prefix.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure may be applied based on the above-described slot structure.

Figure 6:
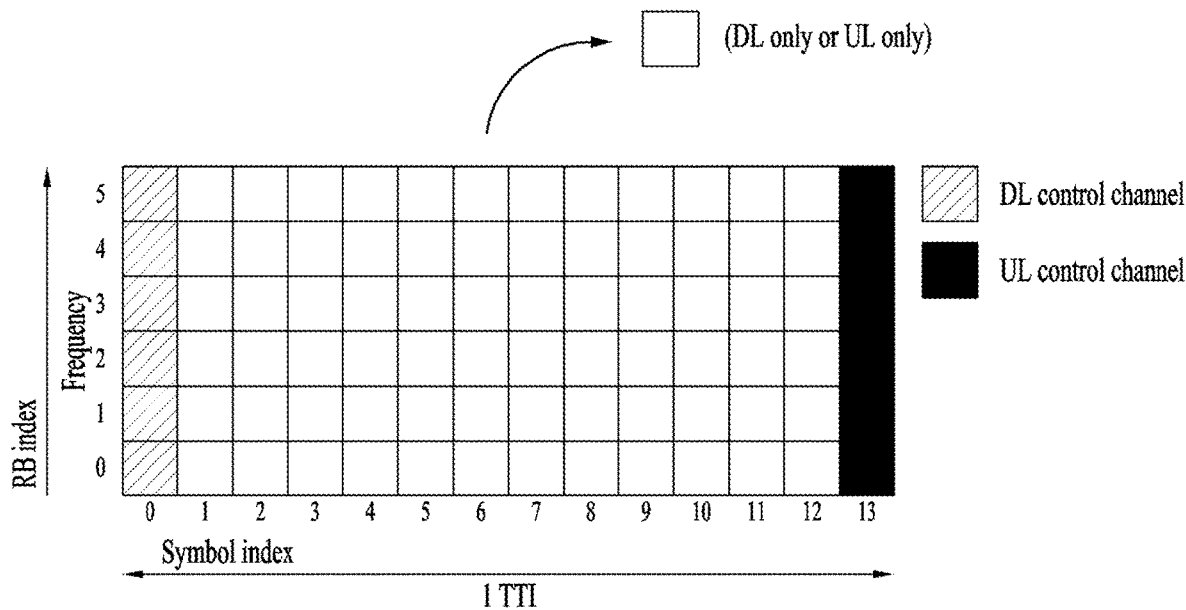
FIG. 6 is a diagram illustrating a self-contained subframe structure applicable to the present invention.

FIG. 6 illustrates a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) may be used for DL or UL data transmission.

Based on this structure, the BS and UE can sequentially perform DL transmission and UL transmission in one slot. That is, the BS and UE may transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required to allow the BS and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

2.3. Analog Beamforming

In a millimeter wave (mmW) system, since a wavelength is short, a number of antenna elements can be installed in the same unit area. That is, assuming that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase in each antenna element. By doing so, independent beamforming can be performed per frequency resource in each antenna element.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
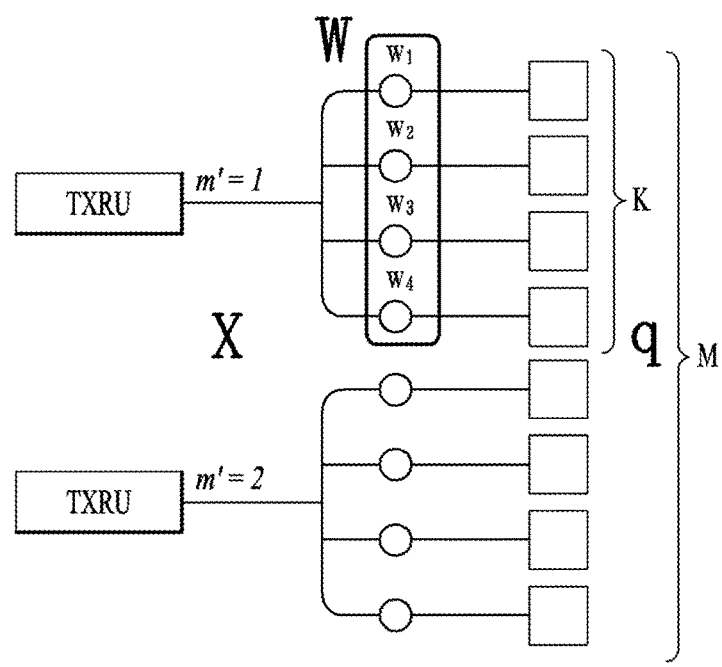
FIGS. 7 and 8 are diagrams illustrating representative methods for connecting TXRUs to antenna elements.
Figure 8:
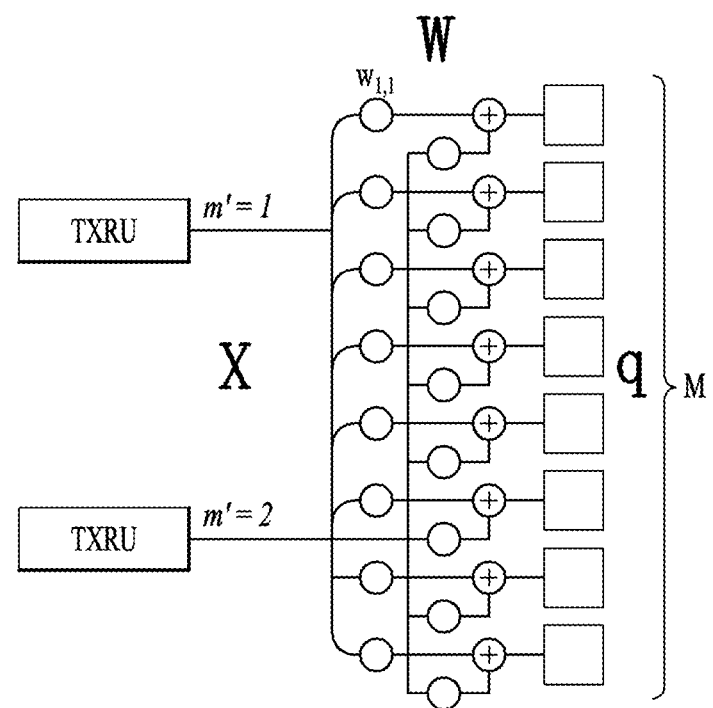

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter for determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
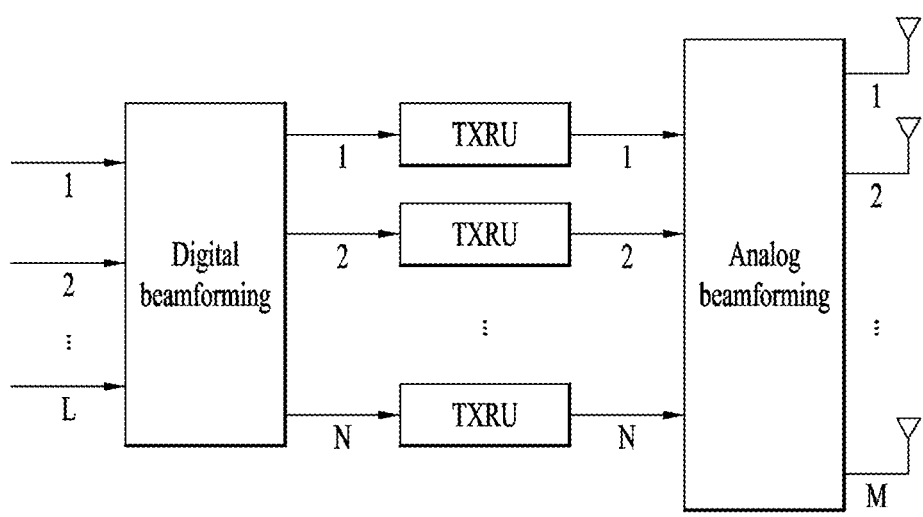
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
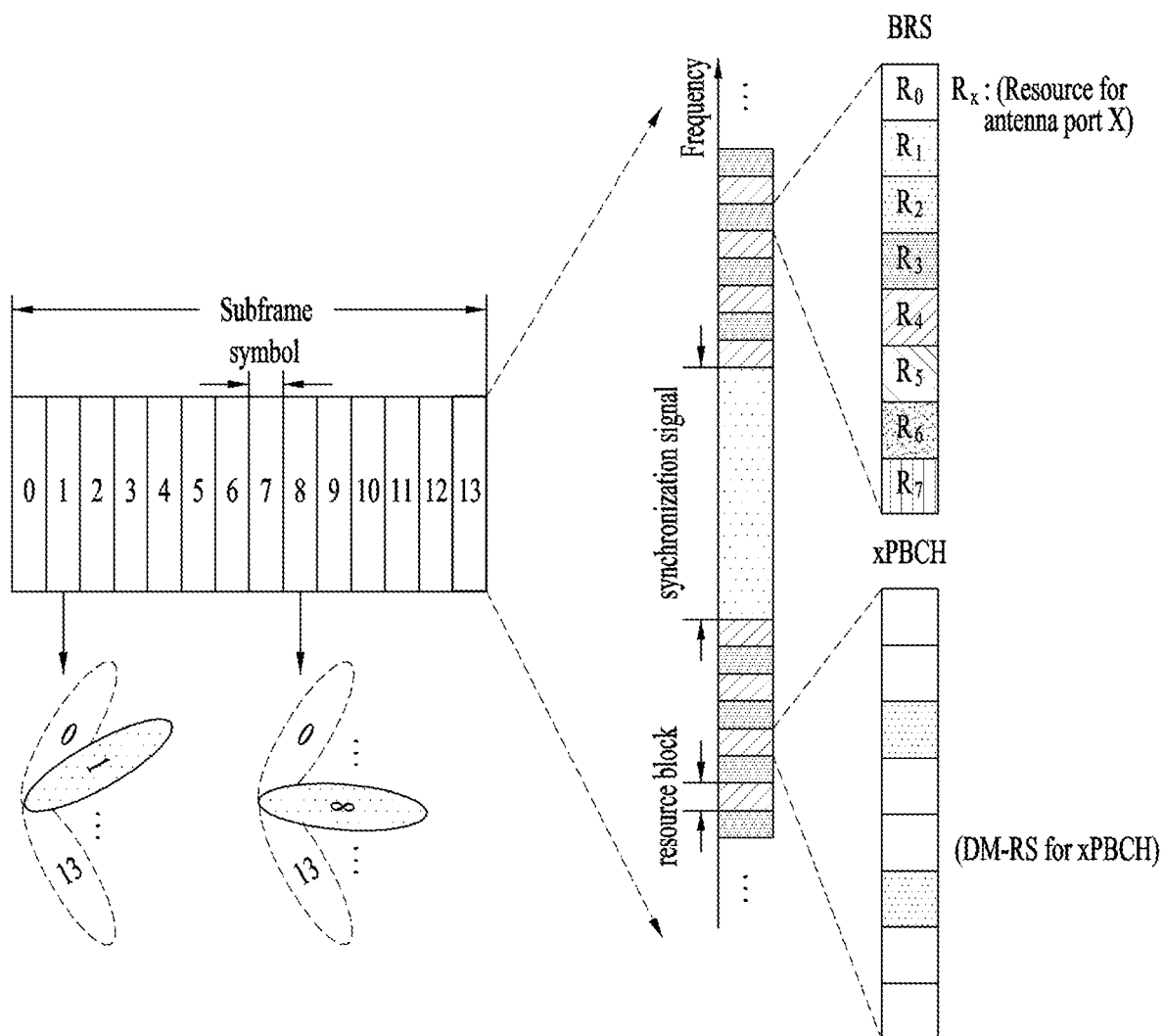
FIG. 10 is a diagram schematically illustrating beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS may be defined for a plurality of antenna ports, and each BRS antenna port may correspond to a single analog beam. In this case, unlike the BRS, all analog beams in an analog beam group may be applied to the synchronization signal or xPBCH to assist a random UE to correctly receive the synchronization signal or xPBCH.

3. Proposed Embodiments

Based on the above-described technical features, the configuration proposed in the present invention will be explained in detail in the following description.

In the NR system to which the present invention is applicable, a physical uplink control channel (PUCCH) for carrying an uplink control indictor (or uplink control information) (UCI) including HARQ-ACK and/or channel state information (CSI) and/or beams and/or scheduling request (SR) related information, etc. may be defined. In a slot composed of 14 (or 7) symbols, a relatively short PUCCH, which is composed of 1 or 2 symbols (hereinafter referred to as an sPUCCH), may be transmitted or a relatively long PUCCH, which is composed of 4 or more symbols (hereinafter referred to as a long PUCCH), may be transmitted.

In addition, a physical uplink shared channel (PUSCH) for UL data transmission may be composed of a relatively small number of symbols (e.g., equal to or less than 3 symbols) or a relatively large number of symbols (e.g., 4 or more symbols) (hereinafter, the former and latter PUSCHs are referred to as an sPUSCH and a long PUSCH, respectively). Similarly, these PUSCHs may be transmitted in one slot. Moreover, a sounding reference signal (SRS) for UL channel estimation may also be transmitted in the corresponding slot.

In this document, a method for configuring a long PUCCH in the NR system to which the present invention is applicable and a method for performing multiplexing between PUCCHs will be described.

3.1. Method for Configuring RS (Reference Signal) and UCI

In the case of a long PUCCH, frequency hopping can be supported in a slot to obtain the frequency diversity gain. In the following description, when frequency hopping is performed within a slot, a resource unit composed of consecutive symbols, which are transmitted on the same frequency resources, is defined as a hopping unit. In particular, a method of configuring a long PUCCH based on the structures of an RS and UCI included in a hopping unit will be described in the present invention.

The hopping unit may have a front-load RS structure where the RS is transmitted in the first symbol. Alternatively, the location of the RS in each hopping unit may be predefined UE-specifically (or UE-group commonly or cell commonly) or configured by higher layer signaling (or L1 signaling).

3.1.1. Long-PUCCH Configuration Method #1

The long PUCCH may be configured with a plurality of mini-PUCCHs, each of which is composed of a specific number of symbols. For example, assuming that the mini-PUCCH is composed of two symbols, in the case of a long PUCCH composed of four symbols, it may include two mini-PUCCHs, and in the case of a long PUCCH composed of six symbols, it may include three mini-PUCCHs.

Figure 11:
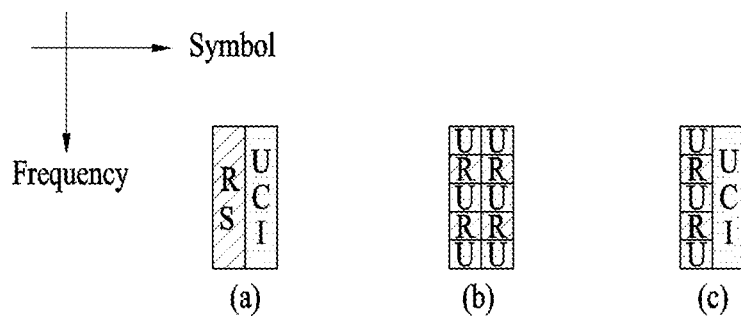
FIG. 11 illustrates an example of the mini-PUCCH composed of two symbols, which is applicable to the present invention.

FIG. 11 illustrates a mini-PUCCH composed of two symbols, which is applicable to the present invention. In this case, the mini-PUCCH composed of two symbols may be configured according to one of the following methods.

Alt. 1: TDMed structure. The TDMed structure means a structure where the RS and UCI are time-division-multiplexed (TDMed) as shown in FIG. 11 (a).

Alt. 2: FDMed structure. The FDMed structure means a structure where transmission subcarriers (or subcarrier groups) between the RS and UCI are frequency division multiplexed (FDMed) (in the pre-DFT (Discrete Fourier Transform) domain) as shown in FIG. 11 (b).

Alt. 3: FDMed+TDMed structure. The FDMed+TDMed structure means a structure where the RS and UCI are TDMed and FDMed at the same time as shown in FIG. 11 (c).

Alt. 4: CDMed structure. The CDMed structure means a structure where the RS and UCI is code division multiplexed (CDMed) in the same resource region.

Alt. 5: RS-less structure. The RS-less structure means a structure where sequences corresponding to the UCI are preconfigured with no RS and only the corresponding sequences are transmitted.

Frequency hopping can be performed on a mini-PUCCH basis, and whether the frequency hopping will be performed is configurable. For example, if a long PUCCH is composed to two mini-PUCCHs, the maximum number of times that frequency hopping can be performed on the corresponding long PUCCH is one, and whether the frequency hopping will be applied is configurable.

As another example, if a long PUCCH is composed of three mini-PUCCHs, the maximum number of times that frequency hopping can be performed on the corresponding long PUCCH is two, and whether the frequency hopping will be applied is configurable as well.

In this case, whether the time-domain OCC (orthogonal cover code) will be applied between RSs and/or UCI symbols in mini-PUCCHs in a hopping unit where the frequency hopping is not performed may be separately configured (configurable). Alternatively, even though the hopping is performed, whether the time-domain OCC will be applied between RSs and/or UCI symbols in mini-PUCCHs transmitted in the same frequency resource region may also be configurable.

Figure 12:
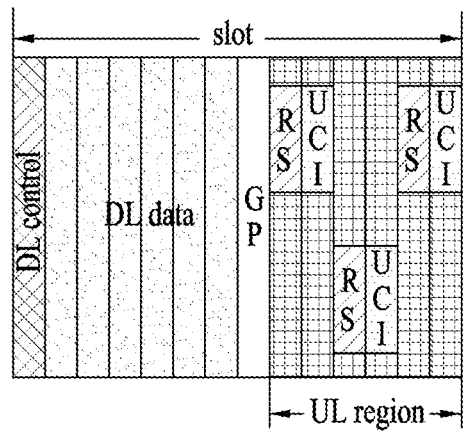
FIG. 12 schematically illustrates the structure of a long PUCCH according to an embodiment of the present invention.

FIG. 12 schematically illustrates the structure of a long PUCCH according to an embodiment of the present invention.

As shown in FIG. 12, the long PUCCH that is transmitted in six symbols may be composed of three mini-PUCCH (having the structure shown in FIG. 11 (a)). When frequency hopping is configured in each mini-PUCCH, if the first and third mini-PUCCHs are be transmitted on the same frequency resources, an OCC may be applied between RSs and/or UCI symbols.

If the mini-PUCCH is composed of two symbols, the restriction that the length of a long PUCCH in a specific slot should be composed of an even number of symbols may be imposed.

To overcome this problem, only when a long PUCCH is composed of an odd number of symbols, it may be allowed to configure a specific mini-PUCCH using three symbols. In this case, the mini-PUCCH composed of three symbols may have a structure where specific symbols included in the existing mini-PUCCH (e.g., RS symbol, UCI symbol, etc.) are repeatedly transmitted. In addition, an OCC may be applied between the symbols that are repeatedly transmitted.

Alternatively, the ratio between the RS and UCI may be adjusted to improve UCI transmission efficiency. That is, as the UCI payload size increases, the mini-PUCCH may be configured such that the ratio of UCI symbols to RS symbols is increased.

3.1.2. Long-PUCCH Configuration Method #2

Figure 13:
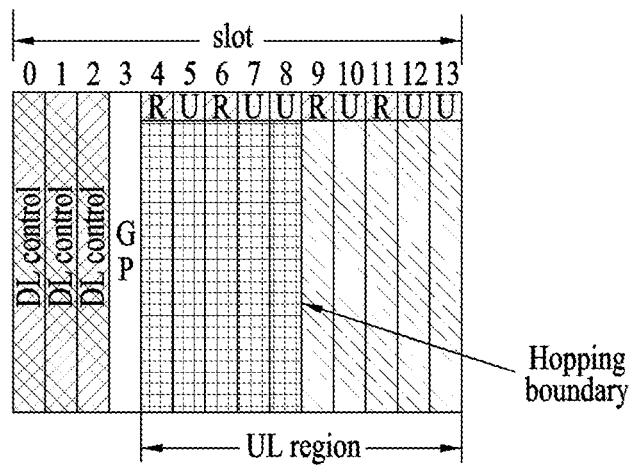
FIG. 13 schematically illustrates the slot structure configured for a long PUCCH structure according to another embodiment of the present invention.

The hopping boundary and/or RS symbol location and/or UCI symbol location can be determined according to the number of symbols included in the UL region of a slot FIG. 13 schematically illustrates the slot structure configured for a long PUCCH structure according to another embodiment of the present invention.

As shown in FIG. 13, in the case of the slot structure in which the UL region is composed of ten symbols, frequency hopping may be configured to be performed at the eighth symbol boundary, and whether each symbol is either a RS transmission symbol or a UCI transmission symbol (or how multiplexing is applied between the RS and UCI, for example, which one of Alt. 1 to Alt. 5 is applied) may be preconfigured.

In this case, if the actual symbol index where the long PUCCH will be transmitted is determined, whether either the RS or UCI will be transmitted in each symbol or where frequency hopping is performed may be automatically determined according to the above determination. If the long PUCCH is configured to be transmitted in symbols #5/6/7/10/11/12, the RS may be transmitted in symbols #6/11, the UCI may be transmitted in symbols #5/7/10/12, and the frequency hopping may be performed after symbol #7.

To configure the symbol index for the long PUCCH transmitted in symbols #5/6/7/10/11/12, transmission in each symbol may be indicated in the form of a bitmap, or the PUCCH starting symbol (e.g., symbol #5) and the number of symbols in each hoping unit (e.g., three symbols) may be indicated.

Alternatively, the hopping boundary and/or the long PUCCH starting symbol and/or the long PUCCH ending symbol and/or the number of symbols in each hopping unit and/or the DMRS location may be indicated UE-specifically (or UE group-commonly or cell commonly) through L1 signaling (or higher layer signaling). In particular, information on the hopping boundary may be signaled UE group-commonly or cell-commonly. In this case, if how a long PUCCH type and/or PRUs (PUCCH resource units) are configured is signaled according to long-PUCCH configuration method #4, which will be described later, the number of symbols in each hoping unit and/or the DMRS location may be configured. In addition, the hopping boundary signaled UE group-commonly (or cell-commonly) can be equally applied not only to the PUCCH but also the PUSCH (particularly, when DFT-s-OFDM is applied).

3.1.3 Long-PUCCH Configuration Method #3

In this section, a UCI configuration method when there are a plurality of UCI transmission symbols on a long PUCCH in one slot will be described in detail.

On the corresponding UCI transmission symbols, only UCI may exist without any RS, or the RS and UCI may be FDMed. This UCI configuration method may be applied when a 2-symbol PUCCH is configured by repeating a 1-symbol PUCCH where the RS and UCI are FDMed as shown in FIG. 11 (b) and when a 2-symbol PUCCH is configured as shown in FIG. 11 (c).

In the following description, the term "modulation symbol" may mean a modulated symbol (e.g., QPSK (Quadrature Phase Shift Keying) symbol, BPSK (Binary Phase Shift Keying) symbol), and the term "symbol" may mean an OFDM symbol or an SC-FDM (Single Carrier-Frequency Division Modulation) symbol.

(1) Alt 1

When UCI is transmitted based on a sequence (e.g., cyclic shifted Zadoff Chu sequence) (for example, a case in which UCI is formed by multiplying a specific sequence with a modulation symbol or a case in which UCI is mapped to cyclic shift resources of a sequence), 1) a modulation symbol for the same UCI bit may be repeated over a plurality of symbols with no time-domain OCC, 2) a time-domain OCC may be applied after repeating a modulation symbol for the same UCI bit over a plurality of symbols, or 3) a modulation symbol for a different UCI bit may be mapped to each symbol.

For example, when a 2-symbol PUCCH is configured with 2-bit UCI, 1) a QPSK modulated (modulation) symbol for the corresponding 2-bit UCI may be repeated over a plurality of symbols (in this case, each symbol sequence may have a different cyclic shift or a different root sequence), 2) a time-domain OCC may be applied after repeating a corresponding QPSK modulated symbol over a plurality of symbols, or 3) a corresponding QPSK modulated symbol may be divided into 1-bit symbols, and then each symbol may be mapped to a different symbol after BPSK modulation. In particular, frequency hopping may be applied in case 1), whereas it may not be allowed in case 2). In addition, a different transmission method may be used in each symbol. For example, in case 1) or 3), for one symbol, UCI may be configured by multiplying a specific sequence with a modulation symbol, and for another symbol, UCI may be mapped to cyclic shift resources of a sequence.

(2) Alt 2

When UCI is transmitted based on (modulation symbols for) coded bits, 1) (a modulation symbol of) the same coded bit for the same UCI may be repeated over a plurality of symbols without any time-domain OCC, 2) (a modulation symbol of) the same coded bit for the same UCI may be repeated over a plurality of symbols, and then, a time-domain OCC may be applied, or 3) (a modulation symbol of) a different coded bit for the same UCI may be mapped to each symbol.

For example, it is assumed that N-bits UCI is transmitted. In this case, if there are X coded bits where RM (Reed Muller) coding or polar coding is applied, 1) X coded bits may be mapped to each symbol equally and repeatedly, 2) a time-domain OCC may be applied after mapping X coded bits to each symbol equally and repeatedly, 3) X coded bits may be mapped to M symbols (in this case, X/M bits are mapped to each symbol). Alternatively, as another example for case 3), although the same number of coded bits, that is, X coded bits, are mapped to each symbol, the X coded bits may be mapped to each symbol based on different coding schemes (e.g., different redundancy versions may be used, or different rate-matching patterns or puncturing patterns may be applied).

(3) Alt 3

When UCI is transmitted based on a coded bit, (a modulation symbol of) a coded bit (where separate coding is applied per UCI) for different UCI may be mapped to each symbol. For example, when 20-bit UCI is transmitted in two symbols, the 20-bit UCI may be divided into two pieces of 10-bit UCI, and coded bits, which are obtained by applying separate coding every bits, may be mapped to each symbol.

As another example, when UCI includes HARQ-ACK and CSI, separate coding is respectively applied to the HARQ-ACK and CSI, and then the HARQ-ACK and CSI may be mapped to different symbols. In addition, similarly, when UCI is transmitted based on a sequence, a modulation symbol for different UCI may be mapped to each symbol.

The above-described alternatives can be combined with each other.

For example, when a long PUCCH is configured, in some symbols, UCI is configured according to Alt 1, and in other symbols, UCI may be configured according to Alt 2 or Alt 3.

In addition, in the case of the 2-symbol PUCCH, UCI part of two symbols may be configured in a different way (for example, based on a sequence or coded bit).

For example, in one symbol, UCI may be FDMed with an RS and transmitted based on a sequence (e.g., cyclic shifted Zadoff Chu sequence) (that is, the UCI may be configured by multiplying a specific sequence with a modulation symbol, or the UCI may mapped to cyclic shift resources of a sequence). On the other hand, the other symbol may be configured with UCI only, and the UCI may be transmitted based on a coded bit (with or w/o DFT and/or with or w/o frequency domain OCC).

As another example, both the two symbols may be in the form of RS/UCI FDM. In one symbol, UCI may transmitted based on a sequence (e.g., cyclic shifted Zadoff Chu sequence) (that is, the UCI may be configured by multiplying a specific sequence with a modulation symbol, or the UCI may mapped to cyclic shift resources of a sequence). On the other hand, the other symbol may be configured with UCI only, and the UCI may be transmitted based on a coded bit (with or w/o DFT and/or with or w/o frequency domain OCC).

In the above example, the UCI transmitted based on a sequence may be the UCI where reliability is very important like HARQ-ACK information, and the UCI transmitted based on a coded bit may be the UCI where reliability is relatively less important like CSI.

3.1.4. Long-PUCCH Configuration Method #4

If various PRUs (PUCCH resource units), which may constitute a hopping unit, are defined, one long PUCCH in a specific slot may be composed of a combination of the corresponding PRUs. In this case, a PRU may be differently configured according to the number of included symbols, UCI payload size, etc.

Table 6 below shows a RPU configuration method according to the present invention.

TABLE 6

| | # of symbols | # of RS symbol(s): # of UCI symbol(s) | UCI payload size |
|---|---|---|---|
| PRU_2 | 2 | 1:1 | All |
| PRU_3 | 3 | 1:2 | All |
| PRU_4a | 4 | 1:3 | High and Mid |
| PRU_4b | 4 | 2:2 | Low |
| PRU_5a | 5 | 1:4 | High and/or Mid |
| PRU_5b | 5 | 2:3 | Low and/or Mid |
| PRU_6a | 6 | 1:5 | High and/or Mid |
| PRU_6b | 6 | 2:4 | High and/or Mid |
| PRU_6c | 6 | 3:3 | Low and/or Mid |
| PRU_7a | 7 | 1:6 | High and/or Mid |
| PRU_7b | 7 | 2:5 | High and/or Mid |
| PRU_7c | 7 | 3:4 | Low and/or Mid |

In Table 6, the low payload size means that the payload size is equal to or less than X bits (e.g., X=2), the mid low payload size means that the payload size is more than X bits and equal to or less than Y bits (e.g., X=2 and Y=21), and the high payload size means that the payload size is more than Y bits (e.g., Y=21).

When PRUs are configured as shown in Table 6 according to the number of symbols in each hoping unit, the long PUCCH of symbols {4,5,6,7,8,9,10,11,12,13,14}, which may exist in a specific slot, may be configured as shown in Table 7. In this case, the long PUCCH may differ according to whether frequency hopping is applied or not.

In addition, when frequency hopping is not applied, the rules applied to the hopping unit described in sections 3.1 and 3.2 of the present invention may be applied to each PRU.

TABLE 7

| Long PUCCH type | # of symbols | w/frequency hopping | w/o frequency hopping |
|---|---|---|---|
| A | 4 | PRU_2 + PRU_2 | PRU_2 + PRU_2 or PRU_4 |
| B | 5 | PRU_2 + PRU_3 | PRU_2 + PRU_3 or PRU_5 |
| C | 6 | PRU_3 + PRU_3 | PRU_3 + PRU_3 or PRU_6 |
| D | 7 | PRU_3 + PRU_4 | PRU_3 + PRU_4 or PRU_7 |
| E | 8 | PRU_4 + PRU_4 | PRU_4 + PRU_4 |
| F | 9 | PRU_4 + PRU_5 | PRU_4 + PRU_5 |
| G | 10 | PRU_5 + PRU_5 | PRU_5 + PRU_5 |
| H | 11 | PRU_5 + PRU_6 | PRU_5 + PRU_6 |
| I | 12 | PRU_6 + PRU_6 | PRU_6 + PRU_6 |
| J | 13 | PRU_6 + PRU_7 | PRU_6 + PRU_7 |
| K | 14 | PRU_7 + PRU_7 | PRU_7 + PRU_7 |

In Table 7, PRU_4 may mean PRU_4a or PRU_4b in Table 6, PRU_5 may mean PRU_5a or PRU_5b in Table 6, PRU_6 may mean PRU_6a, PRU_6b, or PRU_6c in Table 6, and PRU 7 may mean PRU_7a, PRU_7b PRU_7c in Table 6. In addition, in the case of PRU_X+PRU_Y, PRU_X may be composed of X symbols preceding in time and PRU_Y may be composed of Y symbols following in time in a long PUCCH composed of (X+Y) symbols. In this case, considering that a shortened long PUCCH may be configured due to a short PUCCH and/or SRS, which may be located at the rear of the given slot (e.g., last N symbols, where N may be selected from the range of 1 to 3), the number of symbols in the PRU, which appears later in time, may be set higher than that in the PRU, which appears first in time.

In this case, a DMRS location in each PRU may be configured as shown in Table 8 below.

TABLE 8

| | # of symbols | # of RS symbol(s) | RS location |
|---|---|---|---|
| PRU_2 | 2 | 1 | $1^{st}$ or $2^{nd}$ |
| PRU_3 | 3 | 1 | $1^{st}$ or $2^{nd}$ or $3^{rd}$ |
| PRU_4a | 4 | 1 | $1^{st}$ or $2^{nd}$ or $3^{rd}$ or $4^{th}$ |
| PRU_4b | 4 | 2 | 1/3 or 2/3 |
| PRU_5a | 5 | 1 | $1^{st}$ or $2^{nd}$ or $3^{rd}$ or $4^{th}$ or $5^{th}$ |
| PRU_5b | 5 | 2 | 2/4 or 2/3 or 3/4 |
| PRU_6a | 6 | 1 | $1^{st}$ or $2^{nd}$ or $3^{rd}$ or $4^{th}$ or $5^{th}$ or $6^{th}$ |
| PRU_6b | 6 | 2 | 2/5 or 3/4 |
| PRU_6b | 6 | 3 | 1/3/5 or 2/3/4 or 3/4/5 or 2/4/6 or 2/3/5 or 2/4/5 |
| PRU_7a | 7 | 1 | $1^{st}$ or $2^{nd}$ or $3^{rd}$ or $4^{th}$ or $5^{th}$ or $6^{th}$ or $7^{th}$ |
| PRU_7b | 7 | 2 | 1/4 or 2/6 or 3/4 or 4/5 |
| PRU_7c | 7 | 3 | 2/4/6 or 3/4/5 |

When the long PUCCH type is configured according to the PRU combination shown in Table 7, the DMRS location may differ in each PRU. In particular, the DMRS location may be mirrored with reference to a boundary between PRUs. For example, when long PUCCH type A is configured by PRU_2+PRU_2, in first PRU_2, the RS may be positioned at the first symbol, and in second PRU_2, the RS may be positioned at the second symbol. As another example, when long PUCCH type G is configured by PRU_5+PRU_5, in first PRU_5, the RS may be located at the second/third symbols (PRU_5b), and in second PRU_2, the RS may be located at the third/fourth symbols (PRU_5b).

Referring to Table. 8, if there is only one RS symbol, the RS may be located in front of the PRU for the purpose of early decoding of UCI, or the RS may be located somewhat in the middle of the RRU in consideration of channel estimation performance. If the number of available RS locations in each PRU is two or more, the BS may inform the UE of the RS location that will be used in real via L1 signaling or higher layer signalling.

When one long PUCCH is configured through a combination of two PRUs as shown in Table 7, if the corresponding long PUCCH is composed of an odd number of symbols, the number of symbols in each PRU may differ. In this case, the number of RS symbols or the number of UCI symbols may be equal in each PRU. For example, long PUCCH type H, which is composed of eleven symbols, may be configured by a combination of PRU_5 and PRU_6. In this case, the long PUCCH type has high payload (or mid payload), both the number of RS symbols in PRU_5 and the number of RS symbols in PRU_6 may be set to 1 in order to match the number of RS symbols. Alternatively, both the number of UCI symbols in PRU_5 and the number of UCI symbols in PRU_6 may be set to four in order to match the number of UCI symbols.

As an embodiment for the DMRS location in each PRU, the long PUCCH structure shown in the following table may be applied.

TABLE 9

| # of symbols | DMRS location w/hopping (R: DMRS symbol, U: UCI symbol, "+": hopping center) | DMRS location w/o hopping (R: DMRS symbol, U: UCI symbol) |
|---|---|---|
| 4 | RU + RU | URUU |
| 5 | RU + URU | UURUU |
| 6 | URU + URU | UURUUU* or URUURU** |
| 7 | URU + URUU | UUURUUU* or URUUURU** |
| 8 | URUU + URUU | |
| 9 | URUU + UURUU | |
| 10 | UURUU + UURUU | |
| 11 | UURUU + UURUUU* or UURUU + URUURU** | |
| 12 | UURUU + UURUUU* or URUURU + URUURU** | |
| 13 | UURUUU + UURUUU* or URUURU + URUUURU** | |
| 14 | UUURUUU + UUURUUU* or URUUURU + URUUURU** | |

*PUCCH for large payload or medium payload
**PUCCH for medium payload

In the case of a long PUCCH supporting large payload size, only one RS symbol may be located in each frequency hop. In this case, if two symbols are included in one hop, the RS symbol is located at the first symbol. If three or four symbols are included in one hop, the RS symbol is located at the second symbol. If five or six symbols are included in one hop, the RS symbol is located at the third symbol. If seven symbols are included in one hop, the RS symbol may be located at the fourth symbol.

The above-described method can be applied to the PUCCH format for medium payload size where a frequency-domain OCC is applied like LTE PUCCH format 5.

Meanwhile, in the case of the PUCCH format for medium payload size where a time-domain OCC is applied, if the number of symbols included in one hop is six or seven, the number of RS symbols in each hop may be two.

Even in the case of large payload size (for example, in a high-mobility scenario such as 500 km/h), two DMRS symbols may be required at a specific hop of the long PUCCH where hopping is performed. For example, referring to Table 9, when six or seven symbols are included in a specific hop of the long PUCCH where hopping is performed, two DMRS symbols may be required in each hop although the payload size is large. In this case, the DMRS symbol location may be determined as the second symbol and the second to last symbol in the hop as shown in Table 9.

However, considering that one symbol interval may decrease as the subcarrier spacing increases, it is possible to reduce the impact of mobility by increasing the subcarrier spacing increase. Considering this, as the subcarrier spacing increases, the number of DMRS symbols in one hop of the long PUCCH where hopping is performed may decrease.

For example, when the subcarrier spacing is equal to or less than X kHz (e.g., X=15 or 30) and the number of symbols in one hop of the long PUCCH where hopping is performed is equal to or less than Y (e.g., Y=6 or 7), two DMRS symbols may be transmitted in each hop even in the case of large payload size. On the contrary, when the subcarrier spacing is equal to or less than X kHz and the number of symbols in one hop of the long PUCCH where hopping is performed is more than Y (e.g., Y=6 or 7), one DMRS symbol may be transmitted in each hop.

In this case, the DMRS symbol location may be determined as the second symbol and the second to last symbol as shown in Table 9.

On the contrary, when the subcarrier spacing is more than X kHz, the number of DMRS symbols per hop of the long PUCCH where hopping is performed may be set to one at all times.

Alternatively, the number of DMRS symbols per hop may be configured based on a combination of the payload size and subcarrier spacing.

For example, when the subcarrier spacing is equal to or less than X kHz (e.g., X=15 or 30) and the payload size (per PRB) is equal to or less than Z (e.g., Z=50 bits per PRB), if the number of symbols in one hop of the long PUCCH where hopping is performed is equal to or less than Y (e.g., Y=6 or 7), two DMRS symbols may be transmitted in each hop even in the case of large payload size. On the contrary, if the number of symbols in one hop of the long PUCCH where hopping is performed is more than Y (e.g., Y=6 or 7), one DMRS symbol may be transmitted in each hop.

In this case, the DMRS symbol location may be determined as the second symbol and the second to last symbol as shown in Table 9.

On the contrary, when the subcarrier spacing is more than X kHz and the payload size (per PRB) is more than Z, the number of DMRS symbols per hop of the long PUCCH where hopping is performed may be set to one at all times.

3.1.5. Long-PUCCH Configuration Method #5

When frequency hopping is applied, the number and locations of DM-RS symbols in each hop may be determined according to the following rules where the early decoding, power transient period, and DM-RS interval are considered.

(1) In the case of a mapping method where the front-loaded DM-RS (i.e., early decoding) and uniform distribution of DM-RSs are simultaneously considered, the DM-RS location may be configured as shown in the following table according to the number of symbols occupying the PUCCH.

TABLE 10

| # of symbols | DMRS location w/hopping (R: DMRS symbol, U: UCI symbol, "+": hopping center) | DMRS location w/o hopping (R: DMRS symbol, U: UCI symbol) |
| --- | --- | --- |
| 4 | RU + RU | URUU |
| 5 | RU + RUU | UURUU or URUUU |

TABLE 10-continued

| # of symbols | DMRS location w/hopping (R: DMRS symbol, U: UCI symbol, "+": hopping center) | DMRS location w/o hopping (R: DMRS symbol, U: UCI symbol) |
| --- | --- | --- |
| 6 | RUU + RUU | RUURUU |
| 7 | RUU + URUU | URUURUU |
| 8 | URUU + URUU | URUU URUU |
| 9 | URUU + UURUU or URUU + URUUU | URUU UURUU or URUU URUUU |
| 10 | UURUU + UURUU or URUUU + URUUU | UURUU UURUU or URUUU URUUU |
| 11 | UURUU + RUURUU or URUUU + RUURUU | UURUU RUURUU or URUUU RUURUU |
| 12 | RUURUU + RUURUU | RUURUU RUURUU |
| 13 | RUURUU + URUURUU | RUURUU URUURUU |
| 14 | URUURUU + URUURUU | URUURUU URUURUU |

(2) In the case of a mapping method where UCI symbols are located at the first/last symbols (except DM-RS symbols) of each hop in consideration of the power transient period, the DM-RS location may be configured as shown in the following table according to the number of symbols occupying the PUCCH.

TABLE 11

| # of symbols | DMRS location w/hopping (R: DMRS symbol, U: UCI symbol, "+": hopping center) | DMRS location w/o hopping (R: DMRS symbol, U: UCI symbol) |
| --- | --- | --- |
| 4 | UR or RU + UR or RU | URUU or UURU |
| 5 | UR or RU + URU | UURUU |
| 6 | URU + URU | URUURU |
| 7 | URU + URUU or UURU | URUURUU or UURUURU |
| 8 | URUU or UURU + URUU or UURU | URUU URUU or URUU UURU or UURU URUU or UURU UURU |
| 9 | URUU or UURU + UURUU | URUU UURUU or UURU UURUU |
| 10 | UURUU + UURUU | UURUU UURUU |
| 11 | UURUU + URUURU | UURUU URUURU |
| 12 | URUURU + URUURU | URUURU URUURU |
| 13 | URUURU + URUURUU or UURUURU | URUURU URUURUU or URUURU UURUURU |
| 14 | URUURUU or UURUURU + URUURUU or UURUURU | URUURUU URUURUU or URUURUU UURUURU or UURUURU URUURUU or UURUURU UURUURU |

(3) In the case of a mapping method where the maximum number of DM-RS symbols of each hop is set to two, mirroring is applied in the case of non-hopping, and at the same time, the uniform DM-RS distribution is considered, the DM-RS location may be configured as shown in the following table according to the number of symbols occupying the PUCCH.

TABLE 12

| # of symbols | DMRS location w/hopping (R: DMRS symbol, U: UCI symbol, "+": hopping center) | DMRS location w/o hopping (R: DMRS symbol, U: UCI symbol) |
| --- | --- | --- |
| 4 | UR + RU | URUU or UURU |
| 5 | UR or RU + URU | UURUU |
| 6 | URU + URU | URUURU |
| 7 | URU + URUU or UURU | UURUURU or URUURUU |
| 8 | UURU + URUU | UURU URUU |
| 9 | URUU + UURUU or UURU + UURUU | UURU UURUU or URUU UURUU |
| 10 | UURUU + UURUU | UURUU UURUU |
| 11 | UURUU URUURU | UURUU URUURU |

TABLE 12-continued

| # of symbols | DMRS location w/hopping (R: DMRS symbol, U: UCI symbol, "+": hopping center) | DMRS location w/o hopping (R: DMRS symbol, U: UCI symbol) |
| --- | --- | --- |
| 12 | URUURU + URUURU | URUURU URUURU |
| 13 | URUURU + UURUURU or URUURUU | URUURU UURUURU or URUURU UURUURU |
| 14 | UURUURU + URUURUU | UURUURU URUURUU |

(4) In the case of a mapping method where the number of DM-RS symbols of each hop is set to one, mirroring is applied in the case of non-hopping, and at the same time, the uniform DM-RS distribution is considered, the DM-RS location may be configured as shown in the following table according to the number of symbols occupying the PUCCH.

TABLE 13

| # of symbols | DMRS location w/hopping (R: DMRS symbol, U: UCI symbol, "+": hopping center) | DMRS location w/o hopping (R: DMRS symbol, U: UCI symbol) |
| --- | --- | --- |
| 4 | UR + RU | URUU or UURU |
| 5 | UR or RU + URU | UURUU |
| 6 | URU + URU | UURUUU or UUURUU |
| 7 | URU + URUU or UURU | UUURUUU |
| 8 | UURU + URUU | UURU URUU |
| 9 | URUU + UURUU or UURU + UURUU | UURU UURUU or URUU UURUU |
| 10 | UURUU + UURUU | UURUU UURUU |
| 11 | UURUU + UURUUU or UUURUU | UURUU UURUUU or UURUU UUURUU |
| 12 | URUURUU + UURUUU | UUURUU UURUUU |
| 13 | UURUUU + UURUUU + UUURUUU | UUURUU UUURUUU or UUURUU UUURUUU |
| 14 | UUURUUU + UUURUUU | UUURUUU UUURUUU |

3.1.6. Long-PUCCH Configuration Method #6

In this section, a method for determining the number of DM-RS symbols per PUCCH duration and per hop when frequency hopping is performed and when not will be described in detail. Particularly, the configuration described in this section can be applied only when UCI payload size is more than K bits (e.g., K=2).

First, when frequency hopping is performed, if the length of at least one hop is more than X symbols, whether the number of DM-RS symbols of the corresponding hop is either one or two may be configured through UE-specific RRC signaling (Method 1), or if the lengths of two hops are more than X symbols, whether the number of DM-RS symbols of all hops is either one or two may be configured through UE-specific RRC signaling (Method 2). In these methods, a hop where the number of DM-RS symbols is not configured may be configured to include one DM-RS symbol at all times.

For example, in the case of X=5, it is assumed that similar to long PUCCH type H, eleven symbols are included, frequency hopping is performed, one hop is composed of five symbols, and the other hop is composed of six symbols.

In this case, according to Method 1, one DM-RS symbol is configured in the 5-symbol hop, but whether there are one or two DM-RS symbols may be configured in the 6-symbol hop. However, according to Method 2, since the 5-symbol hop is present, each of the two hops may be configured with one symbol.

In the case of Method 2, only when the length of every hop is more than five symbols, whether the number of DM-RS symbols of every hop is one or two may be configured.

When frequency hopping is not applied, if the number of symbols included in the corresponding long PUCCH is equal to or less than Y, the number of DM-RS symbols may be set to one at all times. In this case, the value of Y may be equal to that of X in Method 1 or 2.

Additionally/alternatively, if the number of symbols included in the long PUCCH is more than Y and equal to or less than Z, the number of DM-RS symbols may be set to two at all times. In this case, according to Method 1, the equations of Y=X and Z=2*X can be satisfied. In addition, according to Method 2, the equations of Y=X and Z=2*X+1 can be satisfied.

Additionally/alternatively, if the number of symbols included in the long PUCCH is W, whether the number of DM-RS symbols is either two or three may be configured through UE-specific RRC signaling. In this case, according to method 1, the equation of W=2*X+1 can be satisfied. For example, in the case of X=5, if eleven symbols are included and frequency hopping is not applied, whether the number of DM-RS symbols is either two or three may be configured.

Additionally/alternatively, if the number of symbols included in the long PUCCH is more than Q, whether the number of DM-RS symbols is either two or four may be configured through UE-specific RRC signaling. In this case, according to Method 1 or 2, the equation of Q=2*X+1 can be satisfied.

3.2. Multiplexing Method

In this section, a method for supporting multiplexing between long PUCCHs or between an sPUCCH and a long PUCCH will be described in detail.

3.2.1. Multiplexing Method #1

In the case of UCI transmission (in a hopping unit), multiplexing between UEs (or antenna ports) may be supported through a frequency domain OCC. In this case, the length of the OCC may differ according to the number of symbols included in the hopping unit.

In addition, in the case of OFDM based UCI transmission, the OCC may be applied in the frequency domain, and in the case of DFT-s-OFDM based UCI transmission, the OCC may be applied in the virtual frequency domain before DFT to maintain the PAPR (Peak to Average Power Ratio).

In particular, when the number of UCI symbols per hopping unit is equal to or less than a specific value (e.g., one symbol) or when the amount of time/frequency resources allocated to UCI is equal to or less than a specific value (e.g., 1 symbol×12 REs), the length of the frequency-domain OCC may be set to one, or it may be not configured.

For example, when UCI is transmitted in two symbols, (virtual) frequency-domain resources per symbol may be divided into two portions, and a length-2 OCC (e.g., [1, 1], [1, −1]) may be applied. In this case, as a method for dividing the (virtual) frequency-domain resources, a comb type method or a method for dividing N REs into two portions each corresponding to N/2 REs may be used.

In addition, when UCI is transmitted in three symbols, (virtual) frequency-domain resources may be divided into three portions, and a length-3 OCC may be applied. In this case, as a method for dividing the (virtual) frequency-domain resources, a comb type method or a method for dividing N REs into three potions each corresponding to N/3 REs may be used.

According to these methods, even when the number of UCI symbols varies, the coding rate can be maintained.

Additionally, the length of the frequency-domain OCC may be determined according to the UCI code rate or the number of UCI symbols.

(1) Alt 1

The length of the frequency-domain OCC may be determined with reference to a specific UCI code rate (R).

For example, the value of K may be determined such that the code rate, which is calculated based on the number of allocated UCI symbols, N and the OCC length, K, becomes the maximum code rate that does not exceed R. In other words, the OCC length may increase as more symbols are configured.

As another example, when the OCC length is set to K with reference to the specific number of UCI symbols, N (in this case, the UCI code rate is equal to or less than R), if the number of UCI symbols becomes less than N and the code rate exceeds R due to combination with the OCC length, K, the OCC length may be set lower than K.

(2) Alt 2

The length of the frequency-domain OCC may be determined with reference to the specific number of UCI symbols (L).

For example, if the number of allocated UCI symbols, N is less than L, a frequency-domain OCC with a relatively short length may be applied. On the contrary, if the number of allocated UCI symbols, N is equal to or more than L, a frequency-domain OCC with a relatively long length may be applied.

As another example, when the number of UCI symbols is equal to or more than the specific number of UCI symbols, L, the OCC length may be set to K. When the number of UCI symbols is less than L, the OCC length may be set lower than K.

This method may be equally applied to the PUCCH which is FDMed between UEs and uses a partial PRB only.

For example, when a PUCCH composed of twelve REs is multiplexed between two UEs, each UE may use six consecutive REs, six odd-numbered REs, or six even-numbered REs for PUCCH transmission.

According to Alt 1, the number of REs available in the frequency domain may be determined with reference to the specific UCI code rate (R).

For example, the value of K may be determined such that the code rate, which is calculated based on the number of allocated UCI symbols, N and the number of REs, K, becomes the maximum code rate that does not exceed R. In other words, the number of REs, K may decrease as more symbols are configured.

As another example, when the number of REs is set to K with reference to the specific number of UCI symbols, N (in this case, the UCI code rate is equal to or less than R), if the number of UCI symbols becomes less than N and the code rate exceeds R due to combination with the number of REs, K, the number of REs may be set higher than K.

According to Alt 2, the number of REs available in the frequency domain may be determined with reference to the specific number of UCI symbols (L).

For example, if the number of allocated UCI symbols, N is less than L, a relatively more number of REs may be applied. On the contrary, if the number of allocated UCI symbols, N is equal to more than L, a relatively less number of REs may be applied.

As another example, when the number of UCI symbols is equal to or more than the specific number of UCI symbols, L, the number of REs may be set to K. When the number of UCI symbols is less than L, the number of REs may be set higher than K.

3.2.2. Multiplexing Method #2

If an sPUCCH is configured based on only sequences as mentioned in Alt. 5 of section 3.1.1, the sPUCCH may be multiplexed with RS symbols and/or (sequence-based) UCI symbols of a long PUCCH. In this case, which time-domain resources and/or frequency-domain resources are used for sPUCCH transmission may be used as UCI.

Figure 14:
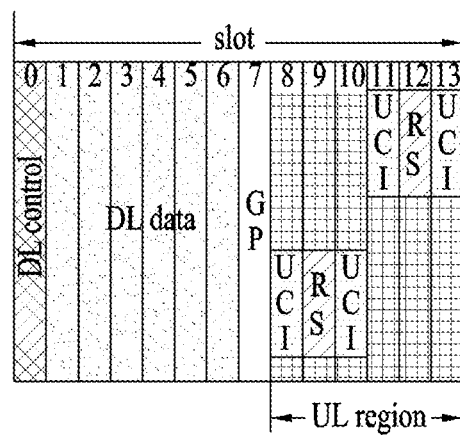
FIG. 14 illustrates a method for multiplexing an sPUCCH with a long PUCCH according to an embodiment of the present invention.

FIG. 14 illustrates a method for multiplexing an sPUCCH with a long PUCCH according to an embodiment of the present invention.

In FIG. 14, if the sequence-based sPUCCH, which is multiplexed with the long PUCCH, is transmitted in symbol #9 (CDMed with a long PUCCH RS), it may mean ACK. If the sPUCCH is transmitted in symbol #12 (CDMed with a long PUCCH RS), it may mean NACK. In other words, the resources for the sPUCCH, which is transmitted from the UE, may be determined depending on whether ACK or NACK is transmitted.

Figure 15:
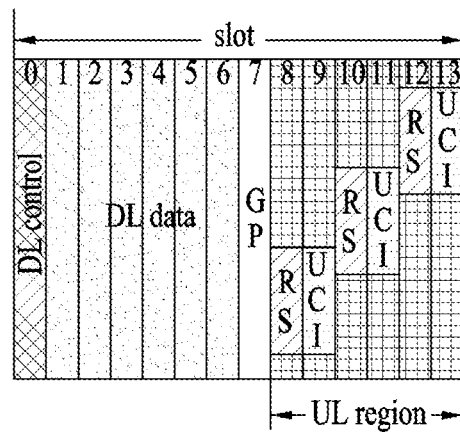
FIG. 15 illustrates a method for multiplexing an sPUCCH with a long PUCCH according to another embodiment of the present invention.

FIG. 15 illustrates a method for multiplexing an sPUCCH with a long PUCCH according to another embodiment of the present invention.

In FIG. 15, to support CDM between the long PUCCH and sPUCCH, symbols #8/9 are allocated to UE1 as ACK/NACK resources, and symbols #10/11 are allocated to UE2 as ACK/NACK resources, and symbols #12/13 may be allocated to UE3 as ACK/NACK resources.

Specifically, CDM can be supported by configuring an RS and UCI for each symbol based on a sequence and allocating a different cyclic shift (CS) value to each UE. In this case, when among a total of N CS values, K CS values are allocated for the sPUCCH and the remaining (N−K) CS values are allocated for the long PUCCH, sequence available resources corresponding to K*the number of long PUCCH symbols (or the number of long PUCCH RS symbols may be used for the sPUCCH.

Referring to FIG. 15, when each symbol has twelve CS resources, the twelfth CS resource corresponding to one of the twelve CS resources may be allocated for the sPUCCH. In this case, since the long PUCCH shown in FIG. 15 is a 6-symbol long PUCCH, a maximum of up to six sequence resources (or sPUCCH resources) may be used. Among the six sequence resources, the twelfth CS resources of symbols #8/9 may be allocated to UE1 as ACK/NACK resources, the twelfth CS resources of symbols #10/11 may be allocated to UE2 as ACK/NACK resources, and the twelfth CS resources of symbols #12/13 may be allocated to UE3 as ACK/NACK resources.

3.2.3 Multiplexing Method #3

When frequency hopping is performed on a two-symbol basis (that is, every two symbols), performance may be degraded due to the power transient period. Accordingly, in this section, an RS/UCI structure in consideration of the property and multiplexing method therefor will be described in detail.

For example, a restriction may be imposed to avoid that only the RS or UCI is set between adjacent symbols located at the hopping boundary.

For example, when a hopping unit is configured every two symbols for a long PUCCH composed of four symbols, i.e., symbols #9/10/11/12, if both symbol #10 and symbol #11 are RS symbols (or UCI symbols), the impact of the power transient period may increase, and thus such an RS/UCI configuration may not be allowed.

Alternatively, if symbol #9 and symbol #11 are RS symbols, a power mask may be configured such that ON duration of the symbols where RSs will be transmitted is completely maintained. In other words, the power mask may be configured such that the power transient period for switching from OFF to ON and/or the power transient period for switching from ON to OFF are not included in a symbol region where RSs will be transmitted.

Figures 16, 17:
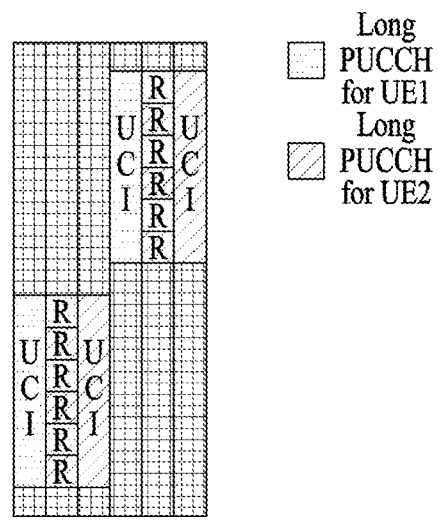
FIG. 16 schematically illustrates a method for supporting multiplexing between long PUCCHs according to an embodiment of the present invention.
FIG. 17 illustrates PRB indexing applicable to a long PUCCH according to an embodiment of the present invention.

FIG. 16 schematically illustrates a method for supporting multiplexing between long PUCCHs according to an embodiment of the present invention.

As shown in FIG. 16, if a long PUCCH is configured such that an X-symbol gap (e.g., X>=1) is present between hopping units, the impact of the power transient period may be reduced. In addition, if UEs share an RS in each hopping unit, the multiplexing capacity may be maximized as well. In this case, as a method for sharing an RS in a specific symbol, FDM/CDM may be applied to each RE (or RE group).

3.2.4. Multiplexing Method #4

As described in sections 3.1.3 or 3.1.4, UCI bits may be transmitted in a plurality of symbols included in one hopping unit, the time-domain OCC may be applied to support CDM between UEs, and the OCC length may vary according to the number of symbols included in the hopping unit.

Alternatively, as described in section 3.2.1, in the case of UCI transmission (in a hopping unit), multiplexing between UEs (or antenna ports) may be supported through the frequency-domain OCC. In this case, the length of the OCC may differ according to the number of symbols included in the hopping unit.

In this section, an RS configuration method when the OCC length varies will be described in detail.

Specifically, if the RS sequence has a fixed length, the cyclic shift (CS) interval of the RS may vary according to the OCC length. In other words, in the case of the RS sequence with a fixed length, as the OCC length increases, the CS interval of the RS may also decrease.

For example, it is assumed that twelve CSs are used and the RS is composed of 12 REs. In this case, if the OCC has a length of 2, two CSs may be allocated at an interval of 6. If the OCC has a length of 4, four CSs may be allocated at an interval of 3.

If the OCC length differs per hopping unit, RSs may be equally allocated with reference to the hopping unit with a short OCC length.

For example, it is assumed that twelve CSs are used and the RS is composed of 12 REs. In the case of the long PUCCH composed of two hopping units, if the OCC length of one hopping unit is 2 and the OCC length of the other hopping unit is 4, the CS may be commonly allocated at an interval of 6 with reference to the hopping unit have the OCC length of 2.

Alternatively, the CS may be differently allocated in each hopping unit. For example, for RSs in a hopping unit with the OCC length of 2, the CS may be allocated at an interval of 6, and for RSs in a hopping unit with the OCC length of 4, the CS may be allocated at an interval of 3. However, for the RSs in the hopping unit with the OCC length of 4, among four CSs allocated at the interval of 3, only two specific CSs may be configured to be valid.

TABLE 14

| # of symbols | DMRS location w/hopping (R: DMRS symbol, U: UCI symbol, "+": hopping center) | DMRS location w/o hopping (R: DMRS symbol, U: UCI symbol) |
|---|---|---|
| 4 | RU + RU | URUU |
| 5 | RU + URU | UURUU |
| 6 | URU + URU | URUURU |
| 7 | URU + URUU | URUUURU |
| 8 | URUU + URUU | |

TABLE 14-continued

| # of symbols | DMRS location w/hopping (R: DMRS symbol, U: UCI symbol, "+": hopping center) | DMRS location w/o hopping (R: DMRS symbol, U: UCI symbol) |
|---|---|---|
| 9 | URUU + UURUU | |
| 10 | UURUU + UURUU | |
| 11 | UURUU + URUURU | |
| 12 | URUURU + URUURU | |
| 13 | URUURU + URUUURU | |
| 14 | URUUURU + URUUURU | |

Specifically, referring to Table 14, when each hopping unit has a different OCC length, RSs may be equally allocated with reference to the hopping unit with a short OCC length.

For example, referring to the column named "DMRS location w/ hopping" of Table 14, when the number of symbols is 4/5, since the short OCC length is 1, one CS is configured (e.g., CS index 0). When the number of symbols is 6/7, since the short OCC length is 2, two CSs are configured (e.g., CS indices 0 and 6). When the number of symbols is 8/9, since the short OCC length is 3, three CSs are configured (e.g., CS indices 0, 4 and 8). When the number of symbols is 10/11/12/13, since the short OCC length is 4, four CSs may be configured (e.g., CS indices 0, 3, 6 and 9).

When frequency hopping is not applied to the long PUCCH in one slot, the above-described method may be equally applied to the entirety of the long PUCCH.

3.2.5. Multiplexing Method #5

As described in section 3.1.4, frequency hopping may be applied or not to the long PUCCH in one slot. In this section, a method of applying a time-domain OCC according to whether frequency hopping is applied will be described in detail.

Specifically, when the frequency hopping is not performed, a time-domain OCC with a long OCC length may be applied.

For example, as described in section 3.1.4, the long PUCCH composed X+Y symbols may be composed of PRU_X and PRU_Y. When PRU_X includes A UCI symbols (where A<X) and PRU_Y includes B UCI symbols (where B<Y), if the frequency hopping is applied, a length-A time-domain OCC and a length-B time-domain OCC may be applied to the PRUs, respectively. On the contrary, if the frequency hopping is not applied, the length-A time-domain OCC and the length-B time-domain OCC may be applied to the PRUs, respectively in the same manner as when the frequency hopping is applied (Opt 1). Alternatively, a length-(A+B) time-domain OCC may be applied (Opt 2).

In this case, a method for transmitting UCI when the length-(A+B) time-domain OCC is applied may differ depending on how the UCI is configured.

For example, when the same UCI is repeated per hopping unit or per PRU similar to LTE PUCCH format 1a/1b, the same UCI transmission method may be applied regardless of whether either Opt 1 or Opt 2 is applied.

As another example, when encoded bits of UCI payload are distributed and transmitted per hopping unit or per PRU similar to LTE PUCCH format 3 (that is, when the frequency hopping is performed), if Opt 2 is applied, the UCI transmission method may vary. That is, when Opt 2 is applied, the encoded bits are not distributed but repeatedly transmitted per PRU.

In addition, when Opt 1 is applied, the corresponding long PUCCH can be easily CDMed with another PUCCH where the frequency hopping is performed. Hereinafter, a resource allocation method for a long PUCCH where hopping is disabled will be described in detail.

FIG. 17 illustrates PRB indexing applicable to a long PUCCH according to an embodiment of the present invention.

As shown in FIG. 17, when PRB indexing is applied to a long PUCCH where frequency hopping is performed, the same PRB indexing may also be applied to a long PUCCH where the frequency hopping is disabled. In this case, in the case of the long PUCCH where the frequency hopping is disabled, only frequency-domain resources for the first hop is allocated but it can be assumed that the corresponding frequency-domain resources are allocated to the second hop.

3.2.6. Multiplexing Method #6

If frequency hopping is applied to a long PUCCH in one slot (or multiple slots), the number of symbols may differ per frequency hop, and thus the time-domain OCC applied to each hop may have a different length. In particular, as in LTE PUCCH format 1a/1b, when UCI and RSs are TDMed, the time-domain OCC may be applied to RS symbols and UCI symbols.

For example, in the case of long PUCCH type H described in section 3.1.3, which is composed of eleven symbols, the first and second hops may correspond to PRU_5b (i.e., two RS symbols and three UCI symbols) and PRU_6c (i.e., three RS symbols and three UCI symbols), respectively (On the contrary, the first and second hops may correspond to PRU_6c and PRU_5b, respectively).

Since the first hop of the corresponding long PUCCH has the smallest number of RS symbols, i.e., two RS symbols, only up to twenty-four UEs can be CDMed by considering twelve CS resources.

At this time, if among three OCCs available for a different RS and UCI, each of which is composed of three symbols (that is, a length-3 OCC can be used), two specific OCCs and twelve CSs are used as PUCCH resource indices, or if all three available OCCs and eight specific CSs among the twelve CSs are used as PUCCH resource indices, the maximum UE multiplexing capacity can be achieved.

Here, the indices of the specific eight CSs may be set to {0, 1, 3, 4, 6, 7, 9, 10} or {0, 2, 3, 5, 6, 8, 9, 11}.

In addition, if the offset value for the CS is set to 2, only six CS resources among the twelve CS resources may be actually used (that is, the CSs with indices of {0, 2, 4, 6, 8, 10} may be used). In this case, if among three OCCs available for a different RS and UCI, each of which is composed of three symbols (that is, a length-3 OCC can be used), two specific OCCs and six CSs are used as PUCCH resource indices or if all three available OCCs and four specific CSs among the six CSs are used as PUCCH resource indices, the maximum UE multiplexing capacity (i.e., twelve UEs) can be achieved. In this case, the indices of the four specific CSs may be some of six available CS resources (e.g., {0, 2, 6, 8} or {0, 4, 6, 10}) or be determined in a uniformly distributed manner (e.g., {0, 3, 6, 9}).

As another example, in the case of long PUCCH type D described in section 3.1.3, which is composed of seven symbols, the first and second hops may correspond to PRU_3 (i.e., one RS symbol and two UCI symbols) and PRU_4b (i.e., two RS symbols and two UCI symbols), respectively (On the contrary, the first and second hops may correspond to PRU_4b and PRU_3, respectively).

Since the first hop of the corresponding long PUCCH has the smallest number of RS symbols, i.e., one RS symbol, only up to twelve UEs can be CDMed by considering twelve CS resources.

At this time, if among two OCCs available for a different RS and UCI, each of which is composed of two symbols (that is, a length-2 OCC can be used), one specific OCC (e.g., [+1 +1]) and twelve CSs are used as PUCCH resource indices (Alt 1), or if all two available OCCs and specific six CSs (e.g., CSs with the indices of {0, 2, 4, 6, 8, 10}) among the twelve CSs are used as PUCCH resource indices (Alt 2), the maximum UE multiplexing capacity can be maintained at the same level.

In addition, if the offset value for the CS is set to 2, only six CS resources among the twelve CS resources may be actually used (that is, the CSs with indices of {0, 2, 4, 6, 8, 10} may be used). In this case, according to Alt 2, only three specific CSs among the six available CS index resources may be used as PUCCH resource indices. In this case, the indices of the specific three CSs may be set to {0, 4, 8}.

Figure 18:
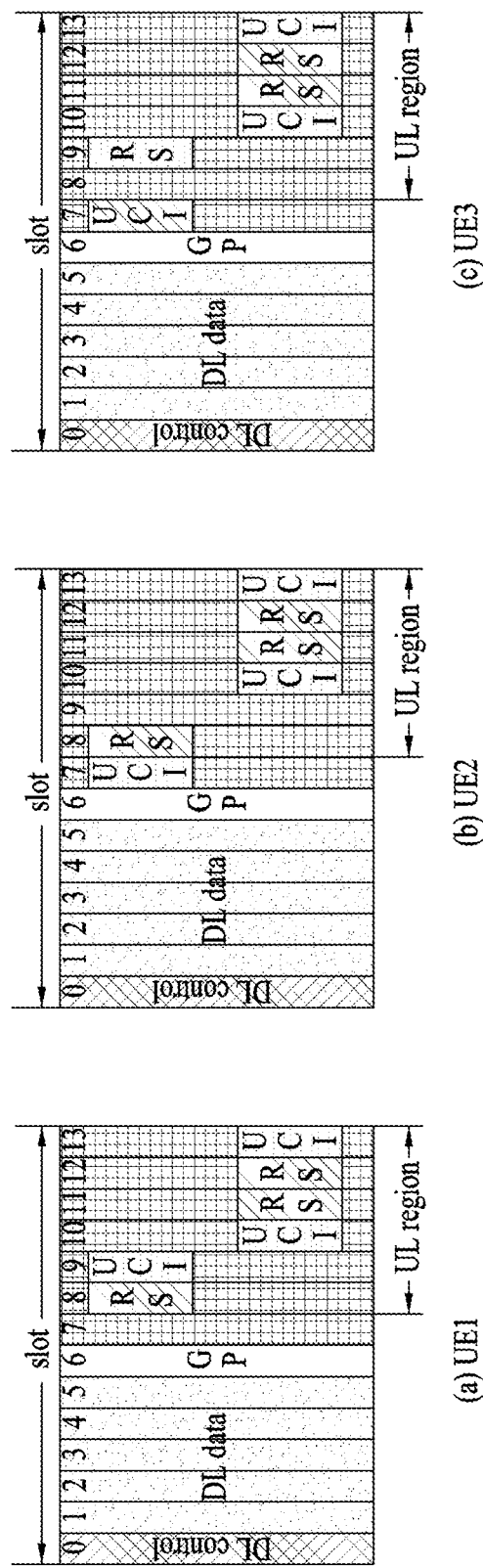
FIG. 18 schematically illustrates long PUCCHs allocated to three UEs.

FIG. 18 schematically illustrates long PUCCHs allocated to three UEs.

As a method for PUCCH resource indexing, according to Alt 1, the PUCCH resource indexing may be performed only for the CSs without consideration of the OCC, and according to Alt 2, the PUCCH resource indexing may be preferentially performed for the OCC.

In this case, the method depicted in FIG. 18 may be considered as a method for improving the UE multiplexing capacity. At this time, since up to six CSs are available in each symbol of the first hop, the UE multiplexing capacity may increase up to 18.

3.2.7. Multiplexing Method #7

As described above in section 3.1.4 or 3.1.5 and with reference to various multiplexing methods, UCI bits are transmitted in multiple symbols in one hopping unit, and the length of an applicable time-domain OCC may vary according to the number of symbols included in the hopping unit in order to support CDM between UEs.

However, considering a tradeoff relationship between the UE multiplexing capacity and supportable payload size, the UE multiplexing capacity may be limited in order to increase the supportable payload size.

Thus, a method for increasing the supportable payload size while limiting the UE multiplexing capacity to up to two UEs using a PUCCH format where the time-domain OCC is applied will be described in the present invention.

First, a case in which four UCI symbols are allocated per frequency hop will be described. When four UCI symbols are allocated per frequency hop, the configuration between DM-RSs and UCI symbols may be determined as follows: UURUU, RUURUU, URUURU, and the like as described in section 3.1.4 or 3.1.5.

Figure 19:
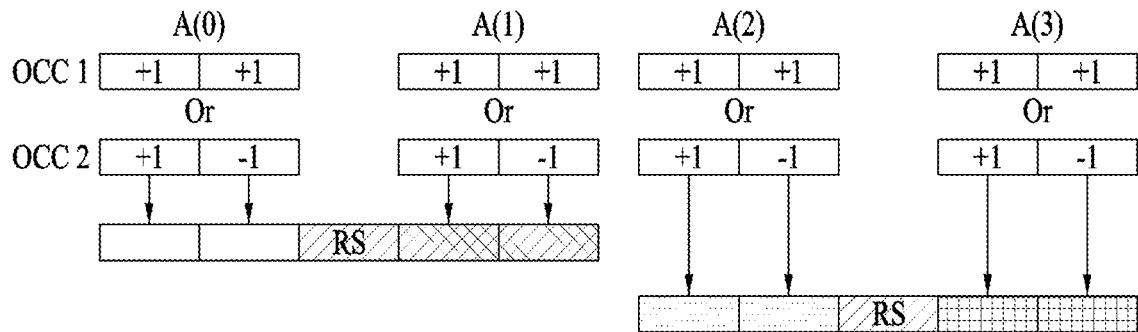
FIG. 19 schematically illustrates a method for configuring four UCI symbols according to an embodiment of the present invention.

FIG. 19 schematically illustrates a method for configuring four UCI symbols according to an embodiment of the present invention.

When four UCI symbols are indexed in time as follows: U(1)U(2)U(3)U(4), each UE repeatedly transmits UCI in U(1) and U(2) and repeatedly transmits UCI in U(3) and U(4) again. Thereafter, each UE may perform transmission by applying an allocated length-2 time-domain OCC (as shown in FIG. 19). Assuming that two UEs to be CDMed on a corresponding PUCCH are UE #1 and UE #2, OCC [+1, +1] is allocated to UE #1 and OCC [+1, −1] may be allocated to UE #2. In this case, UE #2 may repeatedly transmits UCI in U(1) and U(2) and perform transmission by multiplying the allocated time-domain cover code [+1, −1] per symbol.

In addition, UE #2 may repeatedly transmits UCI in U(3) and U(4) and perform transmission by multiplying the allocated time-domain cover code [+1, −1] per symbol.

Although it is assumed in the above example that the OCC applied to [U(1), U(2)] is the same as that applied to [U(3), U(4)], different OCCs may be allocated and applied.

Next, a case in which five UCI symbols are allocated per frequency hop will be described in detail. When five UCI symbols are allocated per frequency hop, the configuration between DM-RSs and UCI symbols may be determined as follows: UURUUU, URUUURU, URUURUU and the like as described in section 3.1.4 or 3.1.5. When five UCI symbols are indexed in time as follows: U(1)U(2)U(3)U(4)U(5), one of the two following methods may be applied.

(1) Method A

Each UE may repeatedly transmit UCI in three symbols: U(1), U(2) and U(3), apply an allocated length-3 time-domain OCC, repeatedly transmit UCI in U(4) and U(5), and then perform transmission by applying an allocated length-2 time-domain OCC. In this case, although three allocated length-3 OCCs may be applied to [U(l), U(2), U(3)], specific two OCCs among them may be used as OCC resources, which will be actually allocated for two UEs to be CDMed.

This method may be efficiently used when the interval between first three UCI symbols is shorter than that between last three UCI symbols in terms of a time interval between UCI symbols where an OCC will be applied like UUURUU.

(2) Method B

Each UE may repeatedly transmit UCI in two symbols: U(1) and U(2), apply an allocated length-2 time-domain OCC, repeatedly transmit UCI in three symbols: U(3), U(4) and U(5), and then perform transmission by applying an allocated length-3 time-domain OCC. In this case, although three allocated length-3 OCCs may be applied to [U(1), U(2), U(3)], specific two OCCs among them may be used as OCC resources, which will be actually allocated for two UEs to be CDMed.

This method may be efficiently used when the interval between last three UCI symbols is shorter than that between first three UCI symbols in terms of a time interval between UCI symbols where an OCC will be applied like UURUUU.

Hereinafter, a case in which six UCI symbols are allocated per frequency hop will be described in detail. When six UCI symbols are allocated per frequency hop, the configuration between DM-RSs and UCI symbols may be determined as UUURUUU as described in section 3.1.4 or 3.1.5. If six UCI symbols are indexed in time as follows: U(1)U(2)U(3)U(4)U(5)U(6), one of the two following methods may be applied.

1) Method 1

Each UE may repeatedly transmit UCI in three symbols: U(1), U(2) and U(3), apply an allocated length-3 time-domain OCC, repeatedly transmit UCI in three symbols: U(4), U(5) and U(6), and then perform transmission by applying the allocated length-3 time-domain OCC. In this case, although three allocated length-3 OCCs may be applied to [U(1), U(2), U(3)] and [U(4), U(5), U(6)], respectively, specific two OCCs among them may be used as OCC resources, which will be actually allocated for two UEs to be CDMed. Alternatively, when all three allocated length-3 OCCs are applied, CDM may be supported between up to three UEs.

2) Method 2

After transmitting UCI in three symbols: U(1)U(2)U(3), each UE repeatedly transmits the UCI in three symbols: U(4)U(5)U(6) and then perform transmission by applying a length-2 time-domain OCC. Assuming that two UEs to be CDMed on a corresponding PUCCH are UE #1 and UE #2, OCC [+1, +1] is allocated to UE #1 and OCC [+1, −1] may be allocated to UE #2. In this case, UE #2 may repeatedly transmits UCI in U(1) and U(2) and perform transmission by multiplying the allocated time-domain cover code [+1, −1] per symbol. In addition, UE #2 may repeatedly transmits UCI in U(1)U(2)U(3) and U(4)U(5)U(6) and perform transmission by multiplying [+1, +1, +1, −1, −1, −1] per symbol using the allocated time-domain cover code [+1, −1].

3) Method 3

Each UE may repeatedly transmit UCI in two symbols: U(1) and U(2), apply an allocated length-2 time-domain OCC, repeatedly transmit UCI in two symbols: U(3) and U(4), apply the allocated length-2 time-domain OCC, repeatedly transmit UCI in two symbols: U(5) and U(6), and then perform transmission by applying the allocated length-2 time-domain OCC.

4) Method 4

Although method 4 is similar to method 3, in method 4, a different symbol pair is used for UCI transmission, compared to method 3. For example, each UE may repeatedly transmit UCI in two symbols: U(1) and U(4), apply an allocated length-2 time-domain OCC, repeatedly transmit UCI in two symbols: U(2) and U(5), apply the allocated length-2 time-domain OCC, repeatedly transmit UCI in two symbols: U(3) and U(6), and then perform transmission by applying the allocated length-2 time-domain OCC.

When the multiplexing capacity of up to two UEs is always provided as described above, the CS value applied to the DM-RS may set to one of {0, 6}.

In addition, when frequency hopping is performed, if the number of UCI symbols varies per hop, the proposed methods may be respectively applied according to the number of UCI symbols in each hop. On the other hand, when the frequency hopping is not applied, if a long PUCCH is composed of seven symbols or less, the method may be applied according to the number of UCI symbols in the entire PUCCH in a corresponding slot. On the contrary, if a long PUCCH is composed of more than seven symbols, the UCI and OCC may be transmitted using the method used when the hopping is performed on the same length of the PUCCH.

3.2.8. Multiplexing Method #8

A long PUCCH transmitted in one slot may include from a minimum of four symbols to a maximum of 14 symbols. If the UCI payload transmitted on the long PUCCH is small, DMRS and data symbols in the long PUCCH may be TDMed. In this case, the data symbol may be transmitted by multiplying a sequence with a modulated symbol (e.g., BPSK or QPSK) (i.e., through sequence modulation).

In this case, the DMRS symbols and data symbols are interlaced in the time domain. For example, assuming that the symbol index starts at index 0, the DMRS symbol may be transmitted in an even symbol index, and the data symbol may be transmitted in an odd symbol index. For example, a 4-symbol PUCCH may be configured as follows: RS/data/RS/data, and a 5-symbol PUCCH may be configured as follows: RS/data/RS/data/RS.

In this configuration, CDM between UEs may be allowed on the same time/frequency resources, or CDM between UEs may be supported through combination of sequence cyclic shifts (CSs) and time-domain OCCs. For example, the maximum number of UEs that can be CDMed may be determined as shown in the following table according to the number of symbols included in a long PUCCH or the length N and whether frequency hopping is applied.

TABLE 15

| Long PUCCH duration N | Maximum UE multiplexing capacity | |
|---|---|---|
| | With hopping | Without hopping |
| 4 | 12 | 24 |
| 5 | 12 | 24 |
| 6 | 12 | 36 |
| 7 | 12 | 36 |
| 8 | 24 | 24 |
| 9 | 24 | 24 |
| 10 | 24 | 24 |
| 11 | 24 | 24 |
| 12 | 36 | 36 |
| 13 | 36 | 36 |
| 14 | 36 | 36 |

Basically, assuming that a frequency-domain resource is one RB (i.e., 12 REs of 12 sub-carriers), the maximum UE multiplexing capacity that can be supported by only the CS is twelve UEs. In this case, as the number of available OCCs increases, the UE multiplexing capacity may also increase.

For example, referring to Table 15, in the case of a long PUCCH composed of four symbols, if hopping is performed, one RS symbol and one data symbol are present in each hop. In this case, the CDM capacity of up to twelve UEs may be supported by only the CS with no time-domain OCC.

As another example, referring to Table 15, in the case of a long PUCCH composed of eight symbols, if hopping is performed, two RS symbols and two data symbols are present in each hop. In this case, the CDM capacity of up to twelve UEs may be supported by combining the CS with two length-2 time-domain OCCs.

Alternatively, in the case of a long PUCCH composed of a specific number of symbols, when the OCC and CS are combined, the number of OCCs/CSs may vary according to the DMRS/data.

In the case of a long PUCCH composed of seven symbols, if the hopping is applied, one hop may be composed of two DMRS symbols and one RS symbol, and the other hop may be composed of two DMRS symbols and two RS symbols (as described in section 3.2.6). In this case, by using two length-2 OCCs and six CSs for the DMRS and RS existing on two symbols and using twelve CSs for the RS existing on one symbol without any OCC, the CDM capacity of up to twelve UEs may be supported.

Similarly, in the case of a long PUCCH composed of eleven symbols, if the hopping is applied, one hop may be composed of three DMRS symbols and two RS symbols, and the other hop may be composed of three DMRS symbols and three RS symbols (as described in section 3.2.6). In this case, by using three length-3 OCCs and eight CSs for the DMRS and RS existing on three symbols and using two length-3 OCCs and twelve CSs for the RS existing on two symbols, the CDM capacity of up to twenty-four UEs may be supported.

When the frequency hopping is not performed, if N is set to 4/5/6/7 (N=4/5/6/7), multiplexing with a long PUCCH where the frequency hopping is performed needs to be considered.

Accordingly, the structure in the case of N=4 without (w/o) hopping needs to be equal to that in the case of N=8 with (w/) hopping and each hop includes four symbols in order to facilitate multiplexing between two PUCCHs.

Thus, it may be desirable that the maximum UE multiplexing capacity in the case of N=4/5 w/o hopping is set equal to that in the case of N=8/9/10/11 w/ hopping and the maximum UE multiplexing capacity in the case of N=6/7 w/o hopping is set equal to that in the case of N=12/13/14 w/hopping.

Additionally, the "maximum UE multiplexing capacity" in the case of N=8/9/10/11/12/13/14 w/o hopping may be set equal to that when the hopping is performed with the same value of N. This is because in the case of N=8 w/o hopping, if the maximum UE multiplexing capacity is set to 48 using a length-4 time-domain OCC, it cannot be multiplexed with the case of N=4 w/o hopping or N=8 w/ hopping, and the orthogonality of the OCC may not be maintained in an environment with large delay spread.

Further, if the OCC structure w/o hopping is set to be equal to that when the same number of symbols are used w/ hopping in order to maintain multiplexing with other long PUCCH where the hopping is performed and the orthogonality of the OCC, different UCI may be transmitted between data groups where the same OCC is not applied w/o hopping (Method A).

For example, as shown in Table 15, the OCC structure in the case of N=8 w/hopping may be equal to that in the case of N=8 w/o hopping. In the case of N=8 w/o hopping, if UCI transmitted in two data symbols in one symbol group composed of first four symbols is defined as P1 and UCI transmitted in two data symbols in another symbol group composed of last four symbols, P1 may be different from P2. In addition, the corresponding long PUCCH format may carry a maximum of 4-bit UCI (or HARQ-ACK) payload.

Moreover, as the subcarrier spacing (hereinafter abbreviated SCS) increases, the symbol duration may decreases. In this case, even though the hopping is not performed on a long PUCCH composed of fourteen symbols, the orthogonality of the time-domain OCC may be maintained.

Therefore, if the SCS is set to equal to or more than S kHz (e.g., S=30 or 60 kHz), in the case of N=8/9/10/11/12/13/14 w/o hopping, the number of available time-domain OCCs may be floor{N/2} as shown in Table 16. For example, in the case of N=8 w/o hopping, the CDM capacity of up to 48 UEs may be supported by applying a combination of the CS and four length-4 OCCs to the DMRS and data, respectively.

TABLE 16

| Long PUCCH duration N | Maximum UE mutiplexing capacity | |
|---|---|---|
| | With hopping | Without hopping |
| 4 | 12 | 24 |
| 5 | 12 | 24 |
| 6 | 12 | 36 |
| 7 | 12 | 36 |
| 8 | 24 | 48 |
| 9 | 24 | 48 |
| 10 | 24 | 60 |
| 11 | 24 | 60 |
| 12 | 36 | 72 |
| 13 | 36 | 72 |
| 14 | 36 | 84 |

On the contrary, if the SCS is less than S kHz, the "maximum UE multiplexing capacity" in the case of N=8/9/10/11/12/13/14 w/o hopping may be set equal to that when the hopping is performed as shown in Table 15. In this case, Method A may be additionally applied. By doing so, different UCI may be transmitted between data groups where the same OCC is not applied w/o hopping.

3.3. Additional Configuration Applicable to Long PUCCH

3.3.1. Method #1

In this section, a resource allocation method for a long PUCCH with multiple symbols will be described.

In the NR system to which the present invention is applicable, the BS may preconfigure a set of PUCCH resource candidates through higher layer (e.g., RRC) signaling to allocated PUCCH resources and dynamically signal one PUCCH resource among the candidates through DCI similar to the ARI (ACK resource indicator) method in the LTE system.

In this case, since a different ARI resource set is configured according to the long PUCCH type described in section 3.1.4 (that is, the number of symbols included in the long PUCCH, the PUCCH resources indicated through DCI may be differently interpreted according to the number of symbols in the allocated long PUCCH.

Alternatively, only valid PUCCH resources can be indexed. For example, it is assumed that when the number of symbols included in the long PUCCH is N, the number of resource indices per PRB (for example, the number of resources determined by a combination of the OCC and CS) is 5. In addition, it is assumed that when the number of symbols included in the long PUCCH is N' (where N'<N), the number of resource indices per PRB is 3. When PUCCH resource index #9 is set one of PUCCH resource candidates, if the allocated long PUCCH includes N symbols, (since when the time-domain OCC is applied, the OCC length decreases as the number of symbols decreases so that the number of available PUCCH resources per PRB may also decrease) PUCCH resource index #9 may represent the fourth PUCCH index in the second PRB. Alternatively, if the allocated long PUCCH includes N' symbols, PUCCH resource index #9 may represent the third PUCCH index in the third PRB.

3.3.2. Method #2

Figure 20:
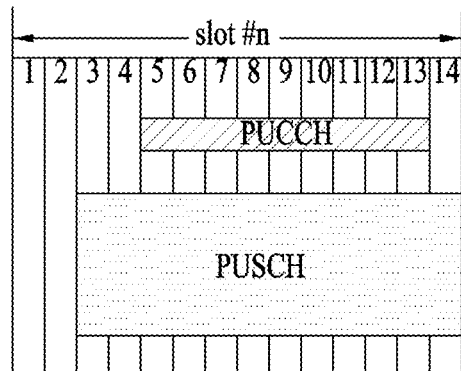
FIG. 20 illustrates a method for transmitting a PUCCH and a PUSCH.

FIG. 20 illustrates a method for transmitting a PUCCH and a PUSCH.

Specifically, FIG. 20 shows a case in which time-domain resources allocated for the PUCCH are different from those allocated for the PUSCH. In this case, a UE may transmit the PUCCH and PUSCH as follows.

For example, after configuring the PUCCH starting symbol by considering the maximum number of PDCCH symbols and DL/UL gaps, the BS may place the location of the PUSCH starting symbol scheduled by the actual number of PDCCH symbols prior to that of the PUCCH starting symbol. In this case, the UE may additionally transmits some PUCCH symbols.

Specifically, the UE may additionally transmit signals transmitted on some PUCCH symbols on PUCCH frequency resources of symbol #3 and symbol #4 in slot #n of FIG. 20. In particular, the UE may additionally transmit RSs (without any OCC) in symbol #3 and symbol #4 in slot #n.

Alternatively, when the BS schedules the PUSCH, the BS may perform scheduling for the corresponding UE by including RBs allocated for the PUCCH. In this case, the UE may perform transmission by performing rate-matching on a UL-SCH in a region which does not overlap with the PUCCH.

Hereinabove, the various structures of the PUCCH, which is transmitted and received between the BS and UE, and PUCCH transmission methods based on the structure have been described. In this case, the proposed embodiments can be selected/applied in various ways according to implementation issues of the UE/BS. For example, in some embodiments, various configurations described in Tables 7 and 8 may be modified and applied in various ways. Hereinafter, a method for transmitting and receiving a physical uplink control channel between the UE and BS according to an embodiment of the present invention will be described in detail.

Figure 21:
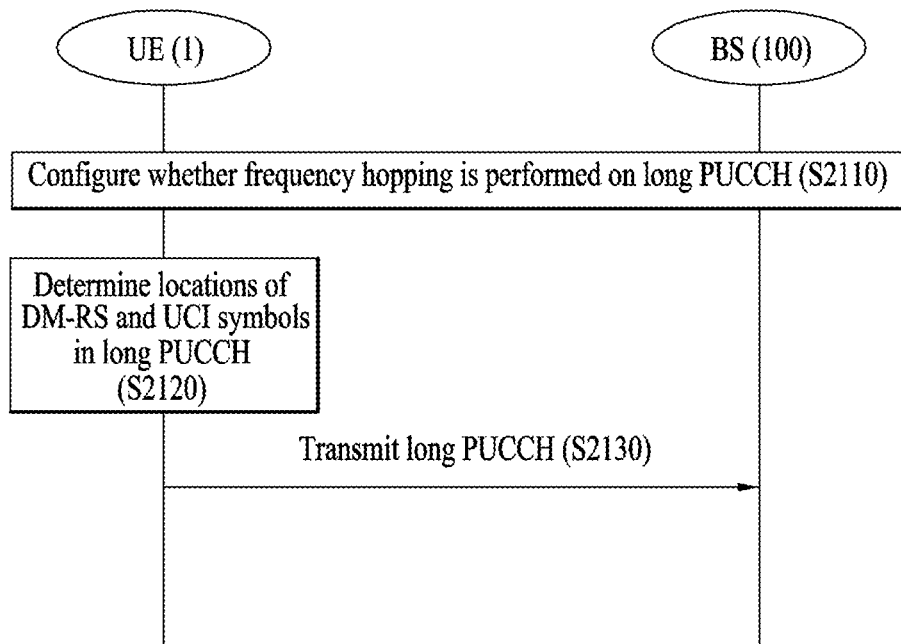
FIG. 21 illustrates a method for transmitting and receiving a physical uplink control channel between a UE and a BS according to an embodiment of the present invention.

FIG. 21 illustrates a method for transmitting and receiving a physical uplink control channel between a UE and a BS according to an embodiment of the present invention.

First, the BS may configures for the UE whether frequency hopping is performed on a PUCCH (long PUCCH) composed of four or more symbols [S2110]. In this case, the configuration operation may be performed through RRC signaling or DCI.

In this case, the UE determines resource locations of a DM-RS and UCI, which are included in the PUCCH and TDMed on different symbols according to symbol duration of the long PUCCH and the presence or absence of the frequency hopping [S2120]. Thereafter, the UE transmits the PUCCH based on the determined resource locations of the DM-RS and UCI [S2130].

In this case, according to various configuration of Tables 7 and 8, the resource locations where the DM-RS and UCI are mapped according to the symbol duration of the PUCCH may vary according to the presence or absence of the frequency hopping or be fixed regardless of the presence or absence of the frequency hopping.

For example, if the symbol duration of the long PUCCH corresponds to 4-symbol duration, the resource locations where the DM-RS and UCI included in the PUCCH are mapped may be configured to vary according to the presence or absence of the frequency hopping. On the other hand, if the symbol duration of the long PUCCH is more than the 4-symbol duration, the resource location where the DM-RS and UCI included in the long PUCCH are mapped may be configured to be fixed regardless of the presence or absence of the frequency hopping.

In particular, when the symbol duration of the long PUCCH is the 4-symbol duration, the number of symbols where the DM-RS in the long PUCCH is mapped may be configured to vary according to the presence or absence of the frequency hopping. For example, if the frequency hopping is configured, the resource location of the DM-RS in the long PUCCH may be determined as the first and third symbols. If the frequency hopping is not configured, the resource location of the DM-RS in the PUCCH may be determined as the second symbol.

As another example, when the symbol duration of the long PUCCH is more than the 4-symbol duration, the DM-RS in the long PUCCH may be mapped to two symbols regardless of the presence or absence of the frequency hopping. In this case, the locations of the symbols to which the DM-RS is mapped may be determined as follows according to the symbol duration of the long PUCCH.

When the symbol duration of the long PUCCH is 5-symbol duration, the DM-RS in the long PUCCH is mapped to the first and fourth symbols regardless of the presence or absence of the frequency hopping (referring to Tables 7 and 8, the combination of PRU_2 ($1^{st}$ symbol)+PRU_3 ($2^{nd}$ symbol) may be applied regardless of the presence or absence of the frequency hopping).

When the symbol duration of the long PUCCH is 6-symbol or 7-symbol duration, the DM-RS in the long PUCCH is mapped to the second and fifth symbols regardless of the presence or absence of the frequency hopping (referring to Tables 7 and 8, the combination of PRU_3 ($2^{nd}$ symbol)+PRU_3 ($2^{nd}$ symbol) or the combination of PRU_3 ($2^{nd}$ symbol)+PRU_4a ($2^{nd}$ symbol) may be applied regardless of the presence or absence of the frequency hopping).

When the symbol duration of the long PUCCH is 8-symbol duration, the resource location of the DM-RS in the long PUCCH is mapped to the second and sixth symbols regardless of the presence or absence of the frequency hopping (referring to Tables 7 and 8, the combination of PRU_4a ($2^{nd}$ symbol)+PRU_4a ($2^{nd}$ symbol) may be applied regardless of the presence or absence of the frequency hopping).

When the symbol duration of the long PUCCH is 9-symbol duration, the resource location of the DM-RS in the long PUCCH is mapped to the second and seventh symbols regardless of the presence or absence of the frequency hopping (referring to Tables 7 and 8, the combination of PRU_4a ($2^{nd}$ symbol)+PRU_5a ($3^{rd}$ symbol) may be applied regardless of the presence or absence of the frequency hopping).

When the symbol duration of the long PUCCH is 10-symbol duration, the resource location of the DM-RS in the PUCCH is mapped to the third and eighth symbols regardless of the presence or absence of the frequency hopping, or the resource location of the DM-RS in the PUCCH is mapped to the second, fourth, seventh, and ninth symbols regardless of the presence or absence of the frequency hopping (referring to Tables 7 and 8, the combination of PRU_5a ($3^{rd}$ symbol)+PRU_5a ($3^{rd}$ symbol) or the combination of PRU_5b ($2^{nd}/4^{th}$ symbols)+PRU_5b ($2^{nd}/4^{th}$ symbols) may be applied regardless of the presence or absence of the frequency hopping).

When the symbol duration of the long PUCCH is 11-symbol duration, the resource location of the DM-RS in the PUCCH is mapped to the third and eighth symbols regardless of the presence or absence of the frequency hopping, or the resource location of the DM-RS in the PUCCH is mapped to the second, third, fourth, seventh, and tenth symbols regardless of the presence or absence of the frequency hopping (referring to Tables 7 and 8, the combination of PRU_5a ($3^{rd}$ symbol)+PRU_6a ($3^{rd}$ symbol) or the combination of PRU_5b ($2^{nd}/4^{th}$ symbols)+PRU_6b ($2^{nd}/5^{th}$ symbols) may be applied regardless of the presence or absence of the frequency hopping).

When the symbol duration of the long PUCCH is 12-symbol duration, the resource location of the DM-RS in the PUCCH is mapped to the third and ninth symbols regardless of the presence or absence of the frequency hopping, or the resource location of the DM-RS in the PUCCH is mapped to the second, fifth, eighth, and eleventh symbols regardless of the presence or absence of the frequency hopping (referring to Tables 7 and 8, the combination of PRU_6a ($3^{rd}$ symbol)+PRU_6a ($3^{rd}$ symbol) or the combination of PRU_6b ($2^{nd}/5^{th}$ symbols)+PRU_6b ($2^{nd}/5^{th}$ symbols) may be applied regardless of the presence or absence of the frequency hopping).

When the symbol duration of the long PUCCH is 13-symbol duration, the resource location of the DM-RS in the PUCCH is mapped to the third and tenth symbols regardless of the presence or absence of the frequency hopping, or the resource location of the DM-RS in the PUCCH is mapped to the second, fifth, eighth, and twelfth symbols regardless of the presence or absence of the frequency hopping (referring to Tables 7 and 8, the combination of PRU_6a ($3^{rd}$ symbol)+PRU_7a ($4^{th}$ symbol) or the combination of PRU_6b ($2^{nd}/5^{th}$ symbols)+PRU_7b ($2^{nd}/6th$ symbols) may be applied regardless of the presence or absence of the frequency hopping).

When the symbol duration of the long PUCCH is 14-symbol duration, the resource location of the DM-RS in the PUCCH is mapped to the fourth and eleventh symbols regardless of the presence or absence of the frequency hopping, or the resource location of the DM-RS in the PUCCH is mapped to the second, sixth, ninth, and thirteenth symbols regardless of the presence or absence of the frequency hopping (referring to Tables 7 and 8, the combination of PRU_7a ($4^{th}$ symbol)+PRU_7a ($4^{th}$ symbol) or the combination of PRU_7b ($2^{nd}/6^{th}$ symbols)+PRU_7b ($2^{nd}/6^{th}$ symbols) may be applied regardless of the presence or absence of the frequency hopping).

The UE and BS can efficiently transmit and receive uplink control information on the long PUCCH configured as described above.

Since each of the embodiments of the above-described proposed methods may be considered as one method for implementing the present invention, it is apparent that each embodiment can be regarded as a proposed method. In addition, the present invention can be implemented not only using the proposed methods independently but also by combining (or merging) some of the proposed methods. Moreover, a rule may be defined such that the BS should inform the UE of information on whether the proposed methods are applied (or information on rules related to the proposed methods) through a predefined signal (e.g., physical layer signal, higher layer signal, etc.).

4. Device Configuration

Figure 22:
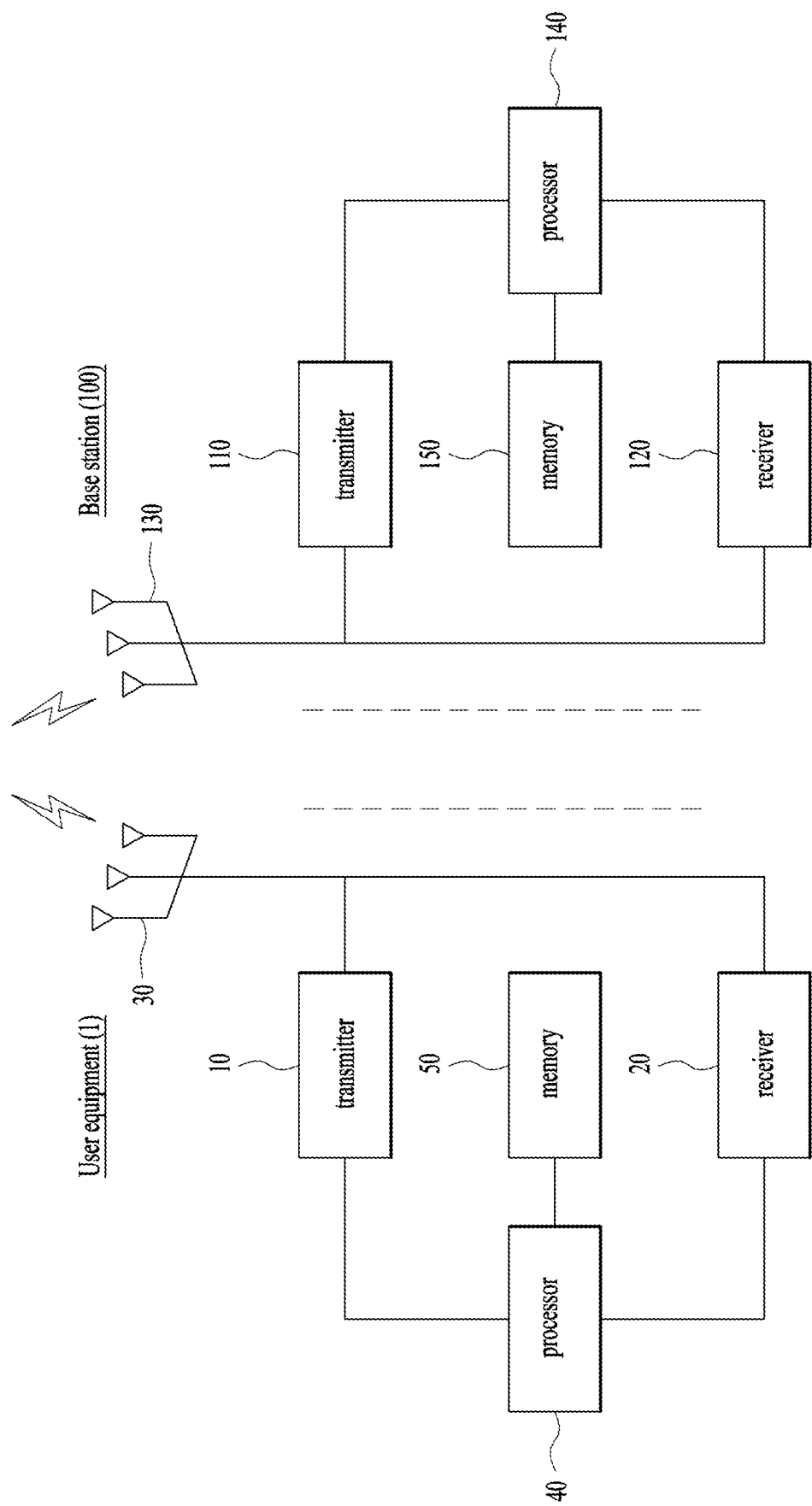
FIG. 22 illustrates the configurations of a UE and a BS for implementing the proposed embodiments.

FIG. 22 is a diagram illustrating configurations of a UE and a BS capable of being implemented by the embodiments proposed in the present invention. The UE and BS illustrated in FIG. 22 operate to implement the above-described embodiments of the method for transmitting and receiving physical uplink control channel therebetween.

The UE 1 may act as a transmission end on UL and as a reception end on DL. The BS (eNB or gNB) 100 may act as a reception end on UL and as a transmission end on DL.

That is, each of the UE and the BS may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 receives configuration information on presence or absence of frequency hopping for transmission of a PUCCH, which is composed of four or more symbols, through the receiver 20 from the BS 100. Next, the UE 1 determines resource locations of a demodulation reference signal (DM-RS) and uplink control information (UCI), which are included in the PUCCH and time-division-multiplexed (TDMed) on different symbols according to symbol duration of the PUCCH and the presence or absence of the frequency hopping, through the processor 40. Thereafter, the UE 1 transmits the PUCCH based on the determined resource locations of the DM-RS and UCI through the transmitter 10.

In addition, the BS 100 transmits configuration information on presence or absence of frequency hopping for transmission of a physical uplink control channel, which is composed of four or more symbols, to the UE 1 through the transmitter 110. Next, the BS 100 receives the PUCCH including a demodulation reference signal and uplink control information, which are time-division-multiplexed (TDMed) on different symbols according to symbol duration of the PUCCH and the presence or absence of the frequency hopping, through the receiver 120 from the UE 1.

In this configuration, if the symbol duration of the PUCCH is equal to or less than X-symbol duration (where X is a natural number), the resource locations to which the DM-RS and UCI are mapped may be configured to vary according to the presence or absence of the frequency hopping, and if the symbol duration of the PUCCH is more than the X-symbol duration (where X is the natural number), the resource locations to which the DM-RS and UCI are mapped may be configured to be fixed regardless of the presence or absence of the frequency hopping. In the case, X may have a value of 4.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 22 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present invention is applicable to various wireless access systems including the 3GPP system, 3GPP2 system and the like. Besides these wireless access systems, the embodiments of the present invention are applicable to all technical fields to which the wireless access systems are applied. Moreover, the proposed methods can also be applied to the mmWave communication system using ultra-high frequency band.

What is claimed is:

1. A method of transmitting uplink control information (UCI) by a user equipment (UE) to a base station (BS) in a wireless communication system, the method comprising:
generating the UCI;
applying a time-domain orthogonal cover code (OCC) to the UCI,
wherein (i) based on intra-slot frequency-hopping being configured for a physical uplink control channel (PUCCH), one time slot includes a plurality of hopping units, and the OCC is configured with a length based on a number of PUCCH symbols in a hopping unit among the plurality of the hopping units, and (ii) based on intra-slot frequency-hopping not being configured for the PUCCH, the OCC is configured with a length based on a number of PUCCH symbols in a time slot; and
transmitting the OCC-applied UCI via the PUCCH, wherein the PUCCH is configured with at least 4 symbols.

2. The method of claim 1, wherein the OCC comprises an orthogonal sequence, and wherein the length of the OCC is a number of symbols in the orthogonal sequence.

3. The method of claim 2, wherein the PUCCH comprises a demodulation reference signal (DM-RS) that is time-division multiplexed with the UCI.

4. The method of claim 3,
wherein for the length of the PUCCH being 4 symbols:
based on the intra-slot frequency hopping being configured for the PUCCH, a first hopping unit and a second hopping unit in the PUCCH each includes one UCI transmission symbol and one DM-RS transmission symbol, and
based on the intra-slot frequency hopping not being configured for the PUCCH, the PUCCH includes two UCI transmission symbols and two DM-RS transmission symbols.

5. The method of claim 3,
wherein for the length of the PUCCH being 8 symbols:
based on the intra-slot frequency hopping being configured for the PUCCH, a first hopping unit and a second hopping in the PUCCH each includes two UCI transmission symbols and two DM-RS transmission symbols, based on the intra-slot frequency hopping not being configured for the PUCCH, the PUCCH includes four UCI transmission symbols and four DM-RS transmission symbols.

6. The method of claim 3,
wherein for the length of the PUCCH being 12 symbols:
based on the intra-slot frequency hopping being configured for the PUCCH, a first hopping unit and a second hopping unit in the PUCCH each includes three UCI transmission symbols and three DM-RS transmission symbols,
based on the intra-slot frequency hopping not being configured for the PUCCH, the PUCCH includes six UCI transmission symbols and six DM-RS transmission symbols.

7. The method of claim 3,
wherein the DM-RS and the UCI are time-division-multiplexed on different symbol locations in the PUCCH based on (i) a number of symbols in the PUCCH and (ii) whether the intra-slot frequency-hopping is configured for the PUCCH.

8. The method of claim 7, wherein transmitting the OCC-applied UCI via the PUCCH comprises:
transmitting the PUCCH based on the DM-RS and the UCI being time-division multiplexed on the different symbol locations in the PUCCH.

9. The method of claim 7,
wherein for the length of the PUCCH being equal to 4 symbols, the different symbol locations in the PUCCH to which the DM-RS and UCI are mapped are configured to vary according to whether the intra-slot frequency-hopping is configured for the PUCCH, and
wherein for the length of the PUCCH being greater than 4 symbols, the different symbol locations in the PUCCH to which the DM-RS and UCI are mapped are configured regardless of whether the intra-slot frequency-hopping is configured for the PUCCH.

10. The method of claim 1, wherein the hopping unit comprises time-consecutive symbols that are transmitted on the same frequency resource.

11. The method of claim 1, further comprising:
receiving, from a base station, configuration information regarding whether the intra-slot frequency-hopping is configured for the PUCCH.

12. A method of receiving uplink control information (UCI) by a base station (BS) from a user equipment (UE) in a wireless communication system, the method comprising:
receiving, from the UE, a physical uplink control channel (PUCCH) that is configured with at least 4 symbols; and
determining, from the PUCCH, one time slot includes a plurality of hopping units, and the UCI to which a time-domain orthogonal cover code (OCC) has been applied,
wherein (i) based on intra-slot frequency-hopping being configured for the PUCCH, the OCC is configured with a length based on a number of PUCCH symbols in a hopping unit among the plurality of the hopping units, and (ii) based on intra-slot frequency-hopping not being configured for the PUCCH, the OCC is configured with a length based on a number of PUCCH symbols in a time slot.

13. A user equipment (UE) configured to transmit uplink control information (UCI) to a base station (BS) in a wireless communication system, the UE comprising:
a transmitter;
a receiver;
at least one processor; and
at least one computer memory operably connectable to the at least one processor and storing instructions that, when executed, cause the at least one processor to perform operations comprising:
generating the UCI;
applying a time-domain orthogonal cover code (OCC) to the UCI, wherein (i) based on intra-slot frequency-hopping being configured for a physical uplink control channel (PUCCH), one time slot includes a plurality of hopping units, and the OCC is configured with a length based on a number of PUCCH symbols in a hopping unit among the plurality of the hopping units, and (ii) based on intra-slot frequency-hopping not being configured for the PUCCH, the OCC is configured with a length based on a number of PUCCH symbols in a time slot; and
transmitting the OCC-applied UCI via the PUCCH, wherein the PUCCH is configured with at least 4 symbols.

14. A base station (BS) configured to receive uplink control information (UCI) from a user equipment (UE) in a wireless communication system, the BS comprising:
a transmitter;
a receiver;
at least one processor; and
at least one computer memory operably connectable to the least one processor and storing instructions that, when executed, cause the at least one processor to perform operations comprising:
receiving, from the UE, a physical uplink control channel (PUCCH) that is configured with at least 4 symbols; and
determining, from the PUCCH, the UCI to which a time-domain orthogonal cover code (OCC) was applied,
wherein (i) based on intra-slot frequency-hopping being configured for the PUCCH, one time slot includes a plurality of hopping units, and the OCC is configured with a length based on a number of PUCCH symbols in a hopping unit among the plurality of the hopping units, and (ii) based on intra-slot frequency-hopping not being configured for the PUCCH, the OCC is configured with a length based on a number of PUCCH symbols in a time slot.

* * * * *